United States Patent
Kim et al.

(10) Patent No.: US 8,345,212 B2
(45) Date of Patent: Jan. 1, 2013

(54) PLANE SWITCHING TYPE LIQUID CRYSTAL DISPLAY DEVICE HAVING BALL SPACERS FORMED ON A BARRIER BETWEEN THE GATE LINE AND THE COMMON LINE

(75) Inventors: Bong Chul Kim, Daegu (KR); Seung Hyun Lee, Gyeonggi-do (KR); Dhang Kwon, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 749 days.

(21) Appl. No.: 12/005,345

(22) Filed: Dec. 27, 2007

(65) Prior Publication Data

US 2008/0266498 A1 Oct. 30, 2008

(30) Foreign Application Priority Data

Apr. 27, 2007 (KR) .................. 10-2007-0041159

(51) Int. Cl.
*G02F 1/1343* (2006.01)
*G02F 1/1339* (2006.01)
(52) U.S. Cl. .................................................. 349/155
(58) Field of Classification Search ............ 49/155–157; 349/155–157, 141
See application file for complete search history.

(56) References Cited

U.S. PATENT DOCUMENTS

| | | | |
|---|---|---|---|
| 6,441,880 B1 * | 8/2002 | Utsumi et al. | 349/155 |
| 2005/0117081 A1 * | 6/2005 | Lee et al. | 349/43 |
| 2006/0146222 A1 * | 7/2006 | Kim et al. | 349/56 |
| 2007/0002261 A1 * | 1/2007 | Lee et al. | 349/155 |
| 2007/0026556 A1 * | 2/2007 | Kitagawa et al. | 438/30 |

FOREIGN PATENT DOCUMENTS

JP 2000-162607 * 6/2000

* cited by examiner

*Primary Examiner* — Lauren Nguyen
(74) *Attorney, Agent, or Firm* — Morgan, Lewis & Bockius LLP

(57) ABSTRACT

Provided are an LCD device and a method for manufacturing the same. The LCD device includes a first substrate, a second substrate, a spacer interposed between the first substrate and the second substrate, and a barrier. The barrier is disposed at least one of the first substrate and the second substrate to control the movement of the spacer. In the method, the first substrate is formed. The second substrate is formed. The barrier is formed on at least one of the first substrate and the second substrate. The spacer is disposed within the barrier. Since the LCD device controls the movement of the spacer, a high aperture ratio is realized.

7 Claims, 27 Drawing Sheets

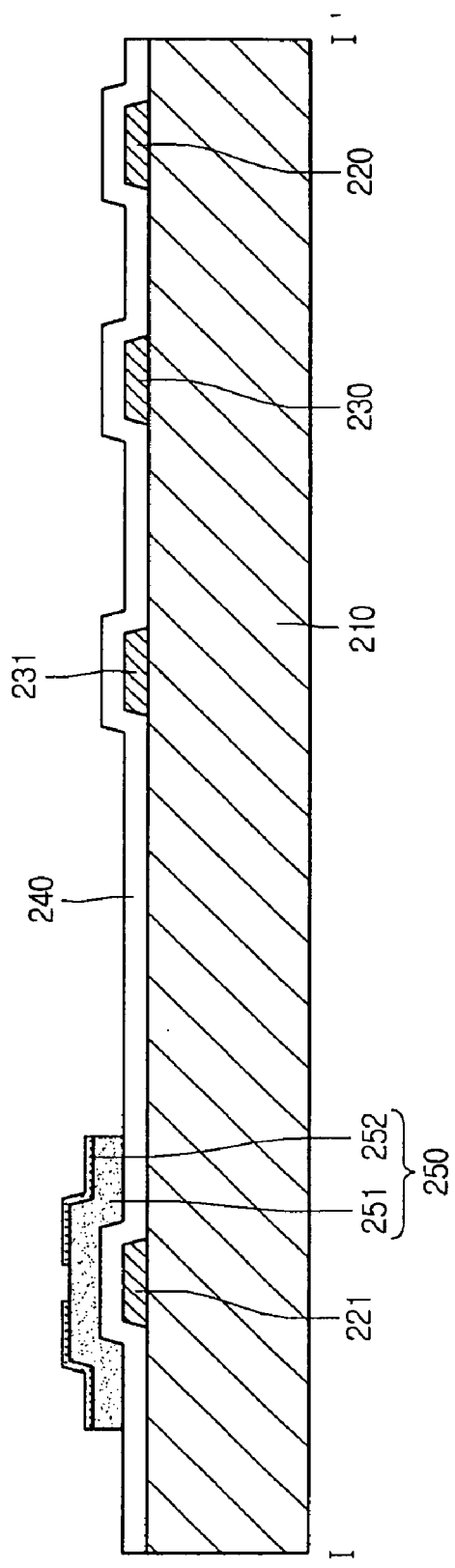

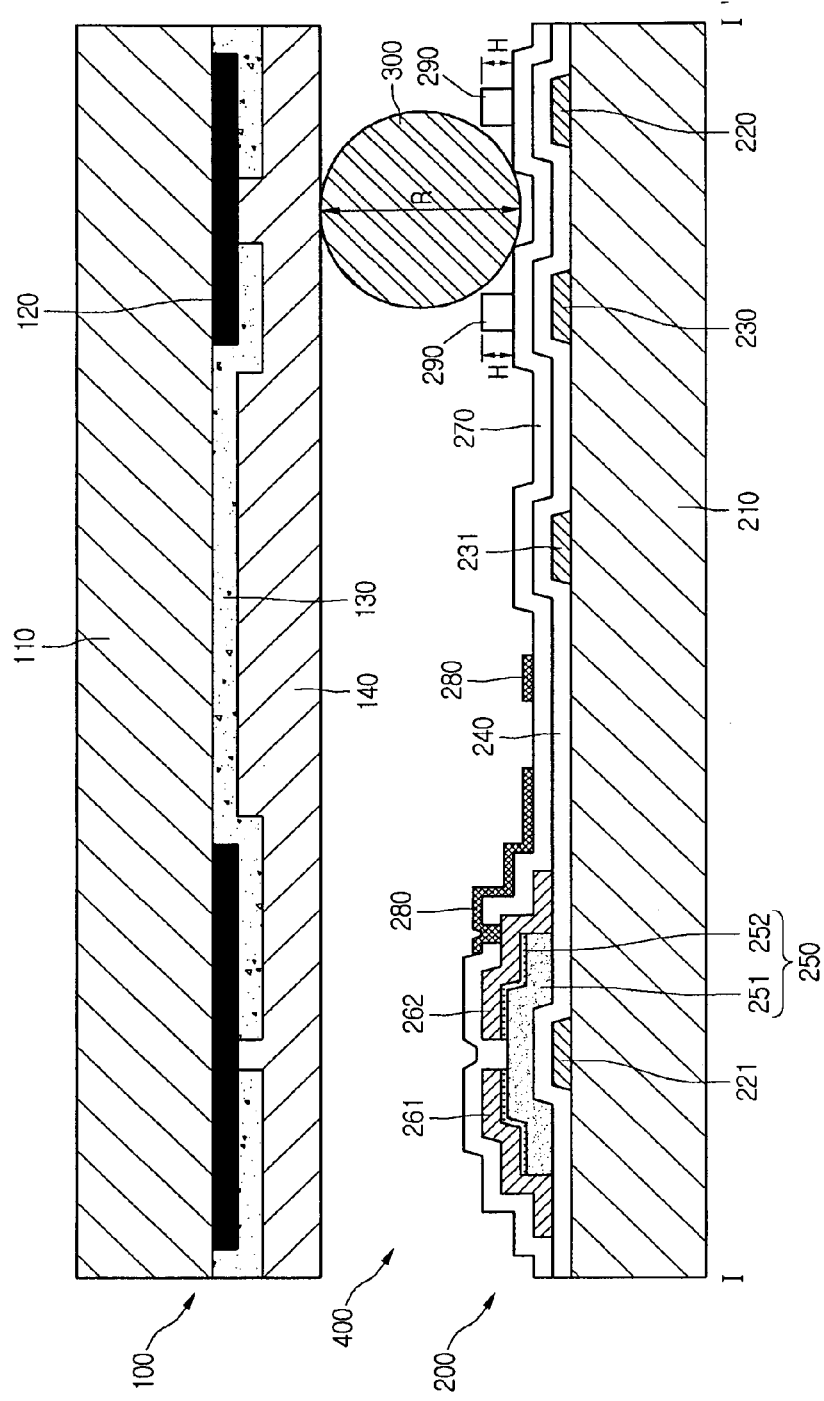

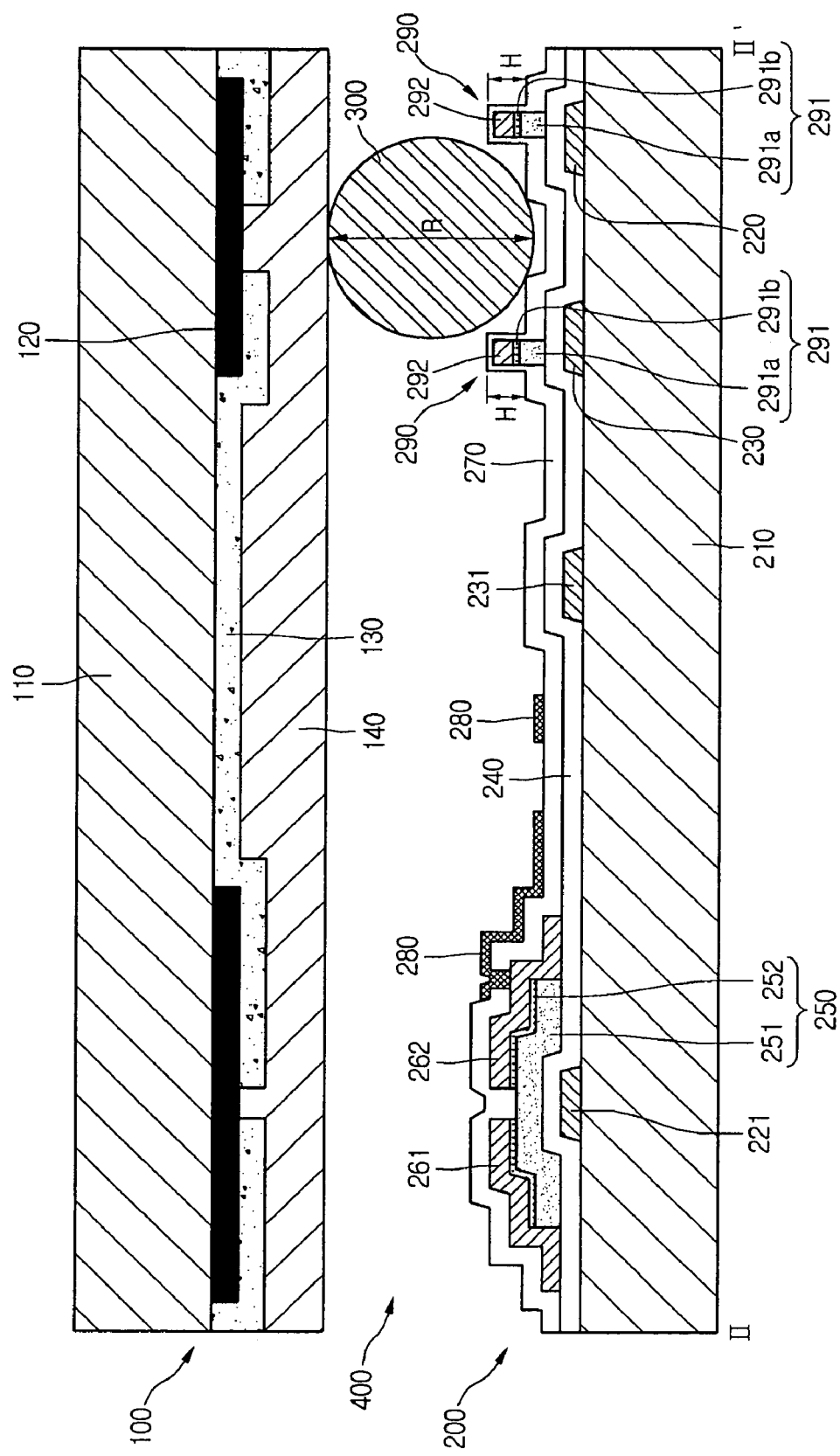

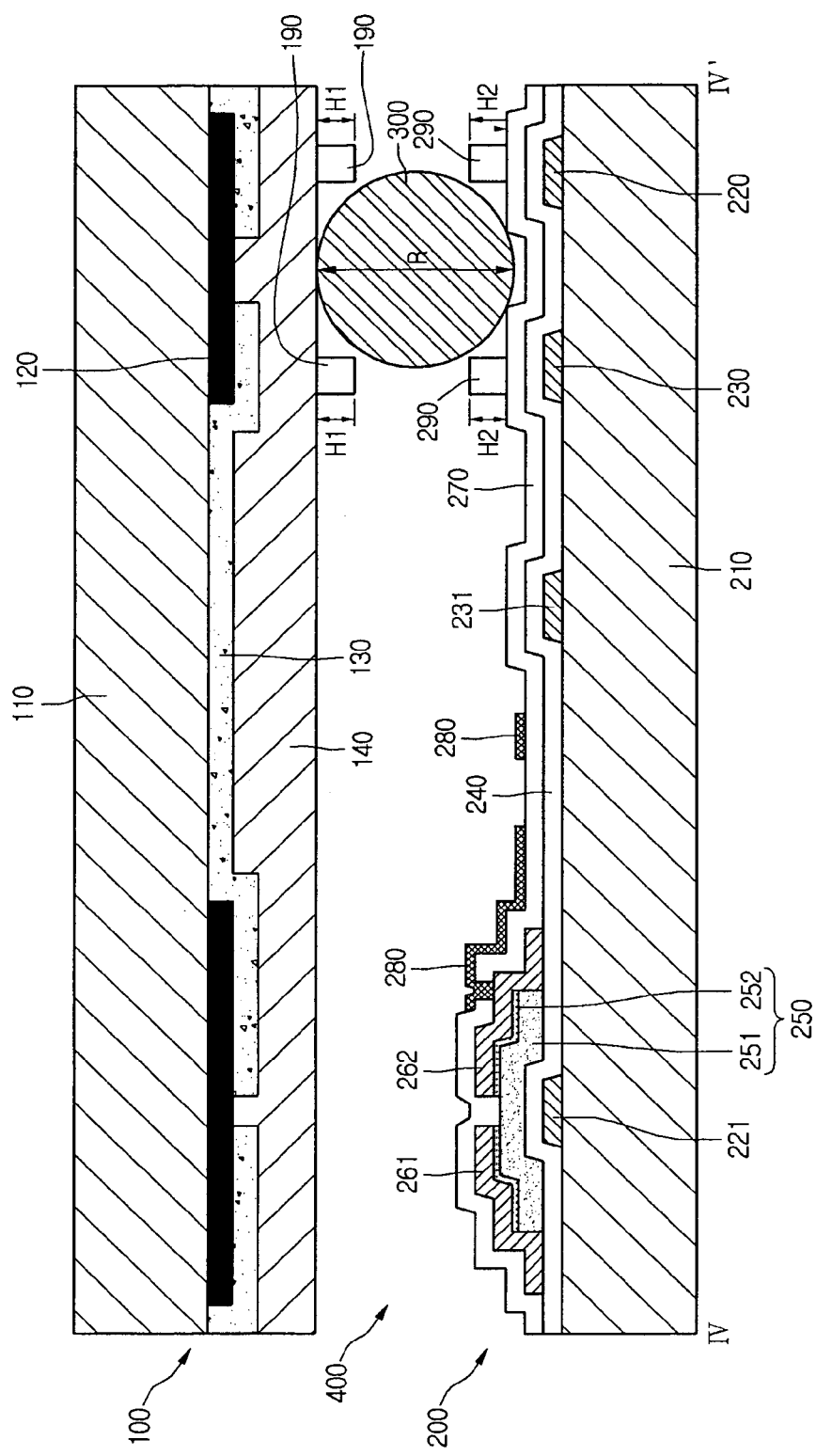

PLANE SWITCHING TYPE LIQUID CRYSTAL DISPLAY DEVICE HAVING BALL SPACERS FORMED ON A BARRIER BETWEEN THE GATE LINE AND THE COMMON LINE

CROSS-REFERENCE TO RELATED APPLICATIONS

The present application claims priority under 35 U.S.C. 119 and 35 U.S.C. 365 to Korean Patent Application No. 10-2007-0041159 filed on Apr. 27, 2007, which is hereby incorporated by reference in its entirety.

BACKGROUND

The present disclosure relates to a liquid crystal display (LCD) device, and more particularly, to an LCD device that can improve image quality reduction generated by spacer movement, and a manufacturing method thereof.

As an information-oriented society develops, a request for display devices increases in various ways. To meet such a request, a variety of flat display devices such as LCD devices, plasma display panels (PDPs), and electro luminescent displays (ELDs) are used.

The LCD devices having characteristics of excellent image quality, a lightweight and slim profile, and low power consumption replace cathode ray tubes (CRTs) as mobile image display devices, and are most widely used.

The LCD device as a general screen display device should have characteristics of high brightness and a large size while maintaining characteristics of a lightweight and slim profile, and low power consumption.

The LCD device includes a color filter substrate, a thin film transistor (TFT) substrate facing the color filter substrate, and a liquid crystal (LC) layer interposed between the two substrates.

A cell gap between the color filter substrate and the TFT substrate should be maintained to realize a high quality image. Therefore, a spacer is used to maintain the cell gap between the two substrates.

Examples of the spacer include a ball spacer formed of elastic plastic corpuscles, and a column spacer fixed on the color filter substrate or the TFT substrate.

Since the column spacer is fixed on the color filter substrate or the TFT substrate, they do not move to a pixel region through which light passes. However, an LCD device maintaining a cell gap using the column spacer has weak restoring force when it is touched or pressed by a user.

Meanwhile, an LCD device maintaining a cell gap using a ball spacer has strong restoring force when it is touched or pressed by a user. However, since the ball spacer can move to the pixel region through which light passes, an aperture ratio and brightness are reduced and light leakage is generated by the ball spacer arranged in the pixel region.

SUMMARY

Embodiments provide a liquid crystal display device that controls movement of a spacer to a pixel region by disposing a barrier controlling movement of the spacer on one of a first substrate and a second substrate, and a manufacturing method thereof.

In one embodiment, a liquid crystal display device includes: a first substrate; a second substrate facing the first substrate; a spacer between the first substrate and the second substrate; and a barrier on one of the first substrate and the second substrate to control movement of the spacer.

In another embodiment, a method for manufacturing a liquid crystal display device includes: forming a first substrate; forming a second substrate facing the first substrate; forming a barrier on at least one of the first substrate and the second substrate; and disposing a spacer inside the barrier.

The details of one or more embodiments are set forth in the accompanying drawings and the description below. Other features will be apparent from the description and drawings, and from the claims.

BRIEF DESCRIPTION OF THE DRAWINGS

FIGS. 3A to 3E are cross-sectional views illustrating a process of a method for manufacturing an IPS mode LCD device according to another embodiment.

FIGS. 6A to 6C are cross-sectional views illustrating a process of a method for manufacturing an IPS mode LCD device according to still another embodiment.

FIG. 11 is a cross-sectional view taken along the line IV-IV' of FIG. 10.

DETAILED DESCRIPTION OF THE EMBODIMENTS

The present disclosure will now be described more fully with reference to the accompanying drawings, in which exemplary embodiments of the invention are shown. The invention may, however, be embodied in many different forms and should not be construed as being limited to the embodiments set forth herein. It will be understood by those skilled in the art that various changes in form and details may be made therein without departing from the spirit and scope of the disclosure.

Embodiment 1

Figure 1:
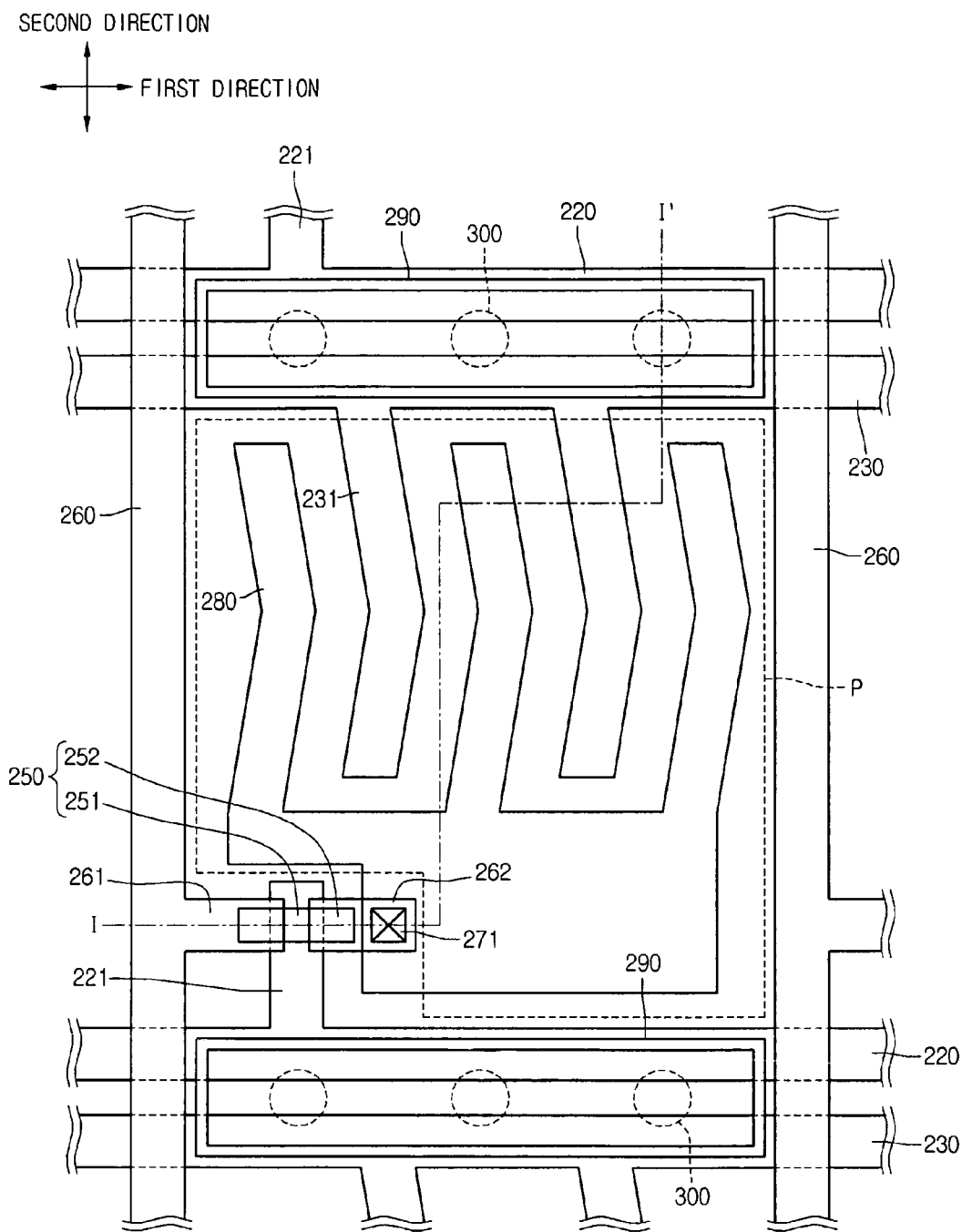
FIG. 1 is a plan view of an IPS mode LCD device according to an embodiment.
Figure 2:
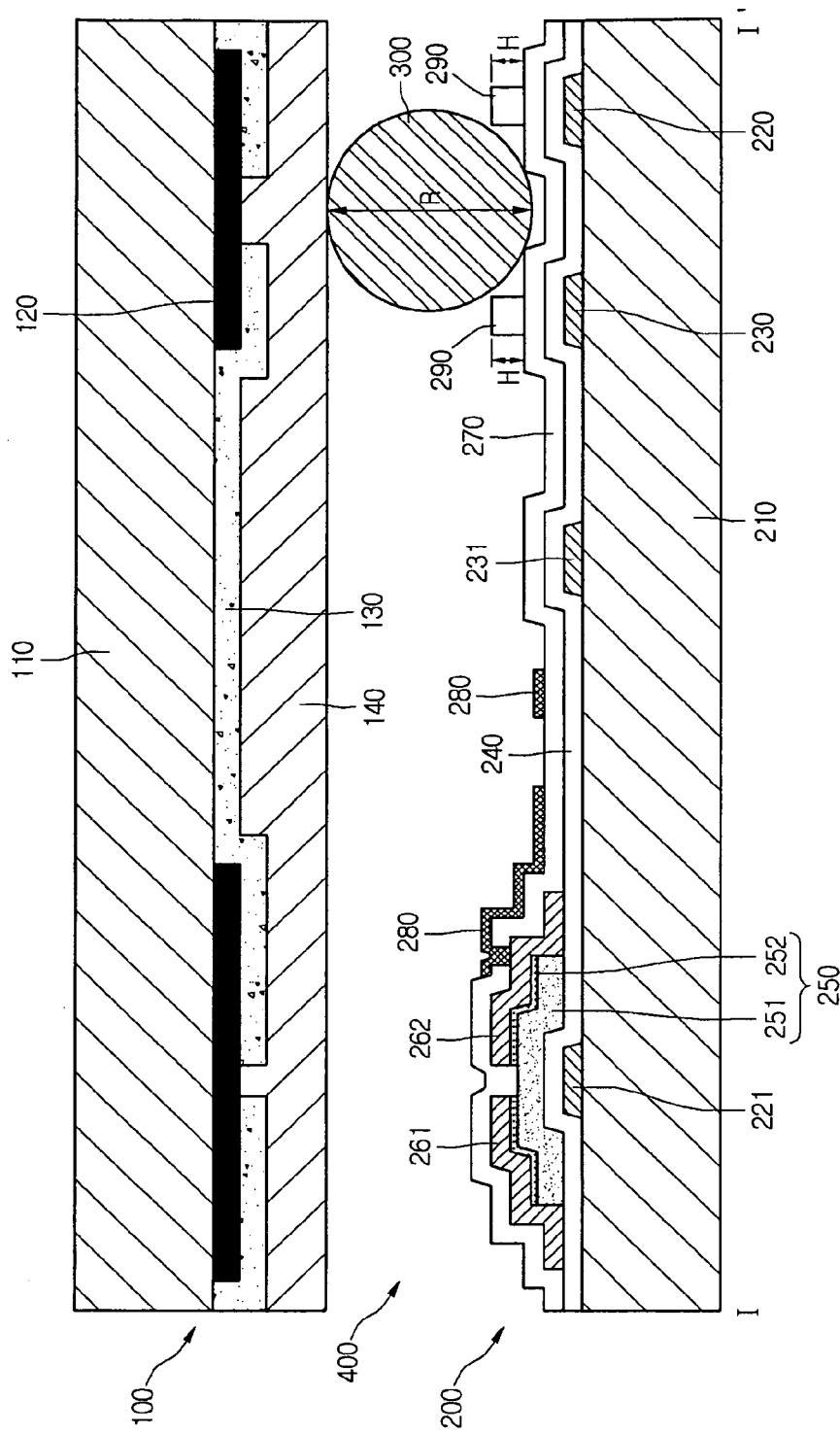
FIG. 2 is a cross-sectional view taken along the line I-I' of FIG. 1.

FIG. 1 is a plan view of an IPS mode LCD device according to an embodiment. FIG. 2 is a cross-sectional view taken along the line I-I' of FIG. 1. Elements of a first substrate are not illustrated in FIG. 1, but FIG. 2 illustrates the elements of the first substrate corresponding to elements of a second substrate.

Referring to FIGS. 1 and 2, an in-plane-switching (IPS) mode LCD includes the first substrate 100, the second substrate 200, a barrier 290, a ball spacer 300, and an LC layer 400.

The first substrate 100 includes a first base substrate 110, a black matrix (BM) pattern 120, a color filter pattern 130, and an overcoat layer 140.

The first base substrate 110 is a transparent nonconductor. The first base substrate 110 can be a glass substrate, for example.

The BM pattern 120 is disposed on the first insulating pattern 110. The BM pattern 120 has a grating structure in which openings are formed when seen from a plane. The BM pattern 120 blocks light.

The color filter pattern 130 is disposed in the openings. A portion of the color filter pattern 130 overlaps the edge of the BM pattern 120. The color filter pattern 130 includes a red color filter pattern, a green color filter pattern, and a blue color filter pattern. The red color filter pattern filters white light to generate red light, the green color filter pattern filters white light to generate green light, and the blue color filter filters white light to generate blue light.

The overcoat layer 140 is disposed on the first substrate 100. The overcoat layer 140 planarizes the first substrate 100. Examples of a material that can be used for the overcoat layer 140 include benzo-cyclo-butene (BCB) and an acryl-based material.

The second substrate includes a second base substrate 210, a gate line 220 having a gate electrode 221, a common line 230 having a common electrode 231, an insulating layer 240, a channel pattern 250, a data line 260 having a source electrode 261, a drain electrode 262, a passivation layer 270, and a pixel electrode 280. The second substrate 200 faces the first substrate 100.

The second base substrate 210 is a transparent nonconductor. The second base substrate 210 can be a glass substrate or a quartz substrate, for example.

The gate line 220 is disposed in a first direction on portions of the second base substrate 210 corresponding to the BM pattern 120. The gate line 220 includes a gate electrode 221 branding therefrom. A gate signal is applied to the gate electrode 221 through the gate line 220.

The common line 230 is in parallel to the gate line 220. The common line 230 includes the common electrode 231 branding therefrom. A common voltage is applied to the common electrode 231 through the common line 230.

The insulating layer 240 covers the gate line 220, the gate electrode 221, the common line 230, and the common electrode 231. Examples of a material that can be used for the insulating layer 240 include $SiN_x$ and $SiO_x$.

The channel pattern 250 includes an amorphous silicon pattern 251 and an n+ amorphous silicon pattern 252. The channel pattern 250 corresponds to the gate electrode 221.

The amorphous silicon pattern 251 is disposed on the insulating layer 240. Examples of a material that can be used for the amorphous silicon pattern 251 include amorphous silicon.

A pair of n+ amorphous silicon patterns 252 separated from each other by a predetermined distance is disposed on the amorphous silicon pattern 251. Examples of a material that can be used for the n+ amorphous silicon pattern 252 include amorphous silicon doped with high concentration impurities.

The data line 260 on the insulating layer 240 crosses the gate line 220 in a second direction to define a pixel region P.

The data line 260 includes the source electrode 261 formed on one of the pair of the n+ amorphous silicon patterns 252 separated from each other. Examples of a material that can be used for data line 260 include Al, an Al alloy, and Cu.

The drain electrode 262 is formed on the other of the pair of the n+ amorphous silicon patterns 252 separated from each other.

The passivation layer 270 covers the channel pattern 250, the data line 220, and the drain electrode 252. The passivation layer 270 includes a contact hole 271 exposing a portion of the drain electrode 262. Examples of a material that can be used for the passivation layer 270 include $SiN_x$ and $SiO_x$.

The pixel electrode 280 is disposed on the passivation layer 270. The pixel electrode 280 is electrically connected to the drain electrode 262 having the portion exposed through the contact hole 271. A potential difference is generated between a data voltage applied to the pixel electrode 280, and a common voltage applied to the common electrode 231. LCs of the LC layer 400 are aligned to a predetermined direction, and an amount of light passing through the LC layer 400 are controlled by the potential difference. Examples of a material that can be used for the pixel electrode 280 include indium-tin-oxide (ITO) and indium-zinc-oxide (IZO).

The barrier 290 is disposed on the passivation layer 270. The barrier 290 can be disposed to correspond to at any one of the gate line 220, the data line 260 and the common line 230. The barrier 290 has a closed loop shape when seen from a plane.

Examples of a material that can be used for the barrier 290 include Al, an Al alloy, Cu, benzo-cyclo-butene (BCB), and an acryl-based material. The height H of the barrier 290 can be about 5% to 80% of the diameter R of the ball spacer 300, which will be described below.

The ball spacer 300 is interposed between the first substrate 100 and the second substrate 200 to maintain a cell gap between the first substrate 100 and the second substrate 200. Examples of a material that can be used for the ball spacer 300 include silica and a resin. The radius R of the ball spacer 300 is about 2.5 μm to 6.5 μm.

The movement of the ball spacer 300 is fixed within the barrier 290 by the barrier 290. The barrier 290 prevents the ball spacer 300 from moving to the pixel region P during a process of manufacturing the IPS mode LCD device. Therefore, a limitation that the ball spacer 300 moves to the pixel region P to reduce an aperture ratio and generate light leakage can be resolved.

The LC layer 400 is interposed between the first substrate 100 and the second substrate 200. The LCs of the LC layer 400 are aligned by an electric field formed between the common electrode 230 and the pixel electrode 280. Light intensity passing through the LC layer 400 changes depending on alignment of the LCs, so that the IPS mode LCD can display an image.

Embodiment 2

FIGS. 3A to 3E are cross-sectional views illustrating a process of a method for manufacturing an IPS mode LCD device according to another embodiment.

Figure 3A:
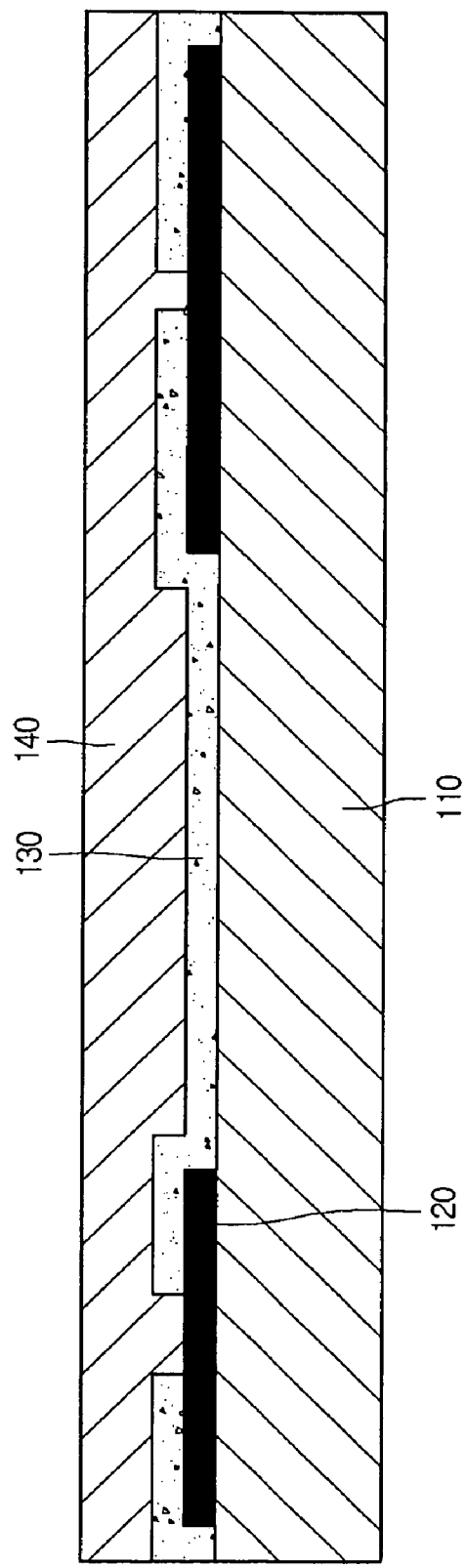

Referring to FIG. 3A, a BM pattern 120, a color filter pattern 130, and an overcoat pattern 140 are formed on a first base substrate 110.

The first base substrate 110 is a transparent nonconductor. The first base substrate 110 can be a glass substrate, for example.

To form the BM pattern 120 on the first base substrate 110, a light blocking layer including a photoresist is formed on the first base substrate 110, and the light blocking layer is patterned a photolithography process including an exposure process and a developing process. After that, the BM pattern 120 that appears patterned in a grating pattern when seen from a plane can be cured by heat and/or light. Examples of a material that can be used for the light blocking layer include a black resin including a photoresist.

After the BM pattern 120 is formed, the color filter pattern 130 is formed in every opening defined by the BM pattern 120.

After the color filter pattern 130 is formed, the overcoat layer 140 is formed on the first base substrate 110 on which the BM pattern 120 and the color filter pattern 130 have been formed.

To form the overcoat layer 140, an organic layer is formed on the first base substrate 110 and then the organic layer is cured using heat and/or light.

Referring to FIG. 3B, a transparent second base substrate 210 is provided. The second base substrate 210 can be a glass substrate or a quartz substrate, for example.

A gate line 220 having a gate electrode 221, a common line 230 having a common electrode 231 are formed on the second base substrate 210. The common line 230 is in parallel to the gate line 220.

To form the gate line 220 and the common line 230, a metal layer is formed on the entire surface of the second base substrate 210. After the metal layer is formed, a photoresist film including a photoresist is formed on the metal layer. The photoresist film is patterned through a photolithography process including an exposure and a developing process to form a photoresist pattern having a shape corresponding to the gate line 220 and the common line 230 on the metal layer. The metal layer is patterned using the photoresist pattern as an etch mask. The gate line 220 including the gate electrode 221, and the common line 230 including the common electrode 231 are formed on the second base substrate 210.

After the gate line 220 and the common line 230 are formed, an insulating layer 240 covering the gate line 220 and the common line 230 is formed on the second insulating layer 210. Examples of a material that can be used for the insulating layer 240 include $SiO_x$ and $SiN_x$.

After the insulating layer 240 is formed, a channel pattern 250 including an amorphous silicon pattern 251 and an n+ amorphous silicon pattern 252 is formed on the insulating layer 240.

To form the channel pattern 250, an amorphous silicon thin film and an n+ amorphous silicon thin film doped with high concentration impurities are sequentially formed on the entire surface of the insulating layer 240. After that, a photoresist film is formed on the entire surface of the n+ amorphous silicon thin film and patterned by a photolithography process, so that a photoresist pattern is formed on the n+ amorphous silicon thin film. After that, the amorphous silicon thin film and the n+ amorphous silicon thin film are patterned using the photoresist pattern as an etch mask to form the channel pattern 250 on the insulating layer 240.

The channel pattern 250 is formed to correspond to the gate line 220. A pair of n+ amorphous silicon patterns 252 separated from each other by a predetermined distance is formed on the amorphous silicon pattern 251.

Figure 3C:
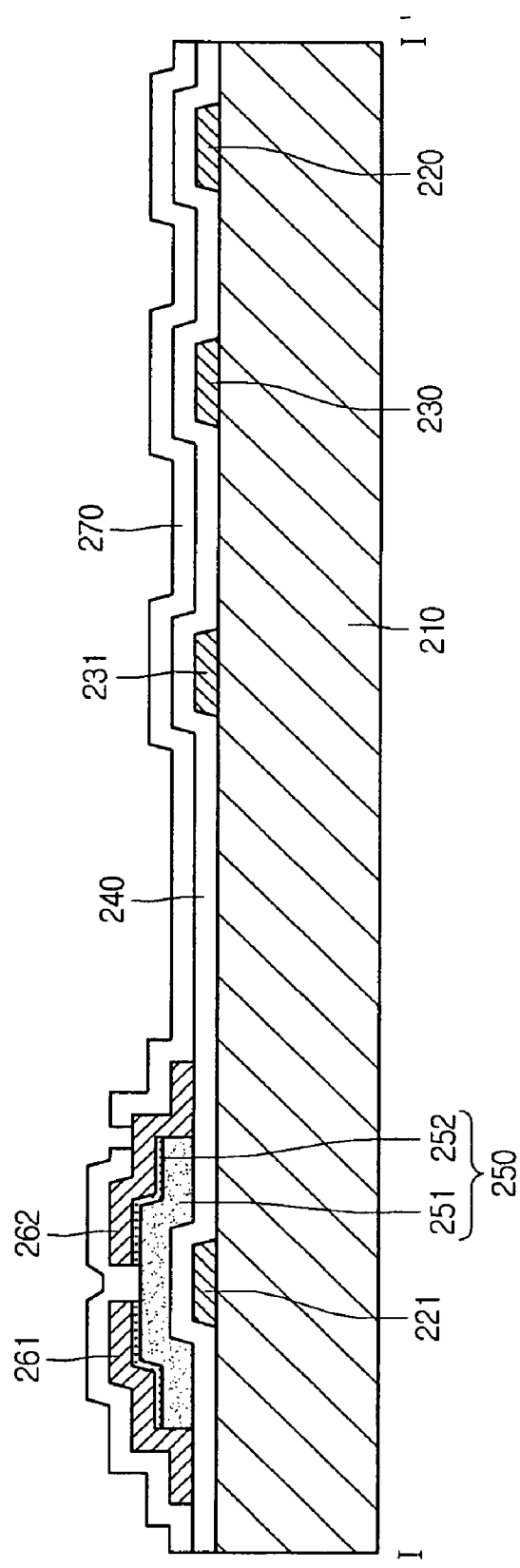

Referring to FIG. 3C, after the channel pattern 250 is formed, a data line 260, a drain electrode 262, and a passivation layer 270 covering the data line 260 and the drain electrode 262 are formed.

To form the data line 260 and the drain electrode 262, source/drain metal layer is formed on the entire surface of the insulating layer 240. A photoresist film is formed on the entire surface of the source/drain metal layer. The photoresist film is patterned through the photolithography process to form a photoresist pattern. The source/drain metal layer is patterned using the photoresist pattern as an etch mask to form the data line 260 and the drain electrode 262 on the insulating layer 240.

The data line 260 crosses the gate line 220 to define a pixel region P. The data line 260 includes a source electrode 261. The source electrode 261 is electrically connected to one of the pair of the n+ amorphous silicon patterns 252. The source electrode 261 is separated from the drain electrode 262. The drain electrode 262 is formed on the other of the pair of the n+ amorphous silicon patterns 252.

After the data line 260 and the drain electrode 262 are formed, a passivation layer 270 covering the data line 260 and the drain electrode 262 is formed.

To form the passivation layer 270, an inorganic layer is formed on the entire surface of the second insulating layer 210 on which the data line 260 and the drain electrode 262 have been formed. A photoresist film is formed on the entire surface of the inorganic layer. The photoresist film is patterned by a photolithography process including an exposure process and a developing process to form a photoresist pattern. The photoresist pattern exposes a portion of the inorganic layer corresponding to the drain electrode 262. The inorganic layer is patterned using the photoresist pattern as an etch mask. The passivation layer 270 is formed on the data line 260 and the drain electrode 262. The passivation layer 270 includes a contact hole 271 exposing a portion of the drain electrode 262.

Figure 3D:
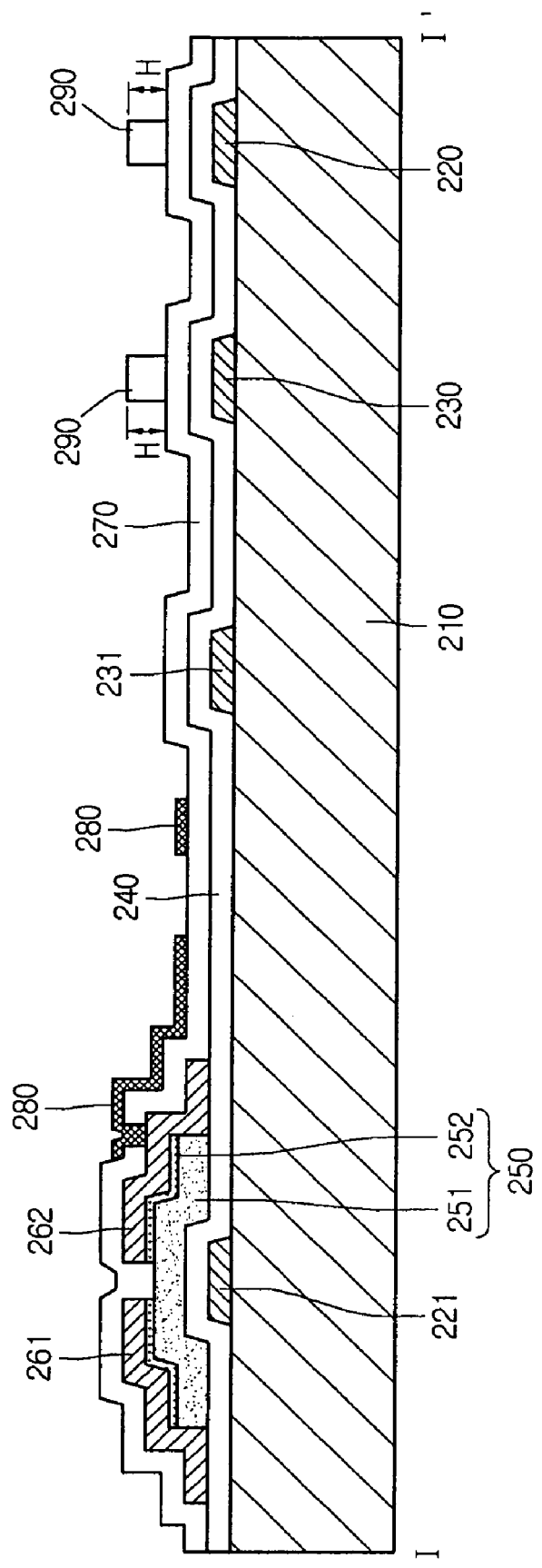

Referring to FIG. 3D, after the passivation layer 270 is formed, a pixel electrode 280 is formed.

To form the pixel electrode 280, a transparent conductive layer having conductivity is formed on the entire surface of the passivation layer 270. A photoresist film is formed on the transparent conductive layer and patterned by a photolithography process to form a photoresist pattern on the transparent conductive layer.

The transparent conductive layer is patterned using the photoresist pattern as an etch mask to form the pixel electrode 280 on the passivation layer 270. The pixel electrode 280 is electrically connected to an exposed portion of the drain electrode 262.

When seen from a plane, the pixel electrode 280 has a comb shape. The pixel electrode 280 and the common electrode 231 are formed in turns.

After the pixel electrode 280 is formed, a barrier 290 is formed on the passivation layer 270.

To form the barrier 290, an organic layer including a photoresist is formed on the entire surfaces of the passivation layer 270 and the pixel electrode 280. The thickness H of the organic layer can be about 5% to 80% of the diameter R of the ball spacer 300, which will be described later. Examples of a material that can be used for the organic layer include BCB including a photoresist and an acryl-based material. After the organic layer is formed, the organic layer is patterned using a photolithography including an exposure process and a developing process to form the barrier 290 on the passivation layer 270.

Unlike the above process, to form the barrier 290, a metal layer can be formed on the entire surfaces of the passivation layer 270 and the pixel electrode 280. The thickness H of the metal layer can be about 5% to 80% of the diameter R of the ball spacer 300, which will be described later. Examples of a material that can be used for the metal layer include Al, an Al alloy, Cu, Mo, and Ti. After the metal layer is formed, a photoresist film is formed on the entire surface of the metal layer. The photoresist film is patterned through a photolithography process to form a photoresist pattern having a shape corresponding to the barrier 290 on the metal layer. The metal layer is patterned using the photoresist pattern as an etch mask to form the barrier 290 on the passivation layer 270.

Unlike the above process, to form the barrier 290, an inorganic layer can be formed on the entire surfaces of the passivation layer 270 and the pixel electrode 280. The thickness H of the inorganic layer can be about 5% to 80% of the diameter R of the ball spacer 300, which will be described later. After the inorganic layer is formed, a photoresist film is formed on the entire surface of the inorganic layer. The photoresist film is patterned through a photolithography process to form a photoresist pattern having a shape corresponding to the barrier 290 on the inorganic layer. The inorganic layer is patterned using the photoresist pattern as an etch mask to form the barrier 290 on the passivation layer 270.

The barrier 290 has a closed loop shape when seen from a plane, and restricts the movement of the ball spacer 300 within the barrier 290. Also, the barrier 290 is formed to correspond to the BM pattern 120. The barrier 290 can be formed to correspond to the gate line 220 or the common line 230.

Through the above process, the barrier 290 is formed on the second substrate 200 including the second base substrate 210, the gate line 220, the common line 230, the insulating layer 240, the channel pattern 250, the data line 260, the drain electrode 262, the passivation layer 270, and the pixel electrode 280.

Referring to FIG. 3E, after the barrier 290 is formed, the ball spacer 300 is disposed within the barrier 290 on the second substrate.

The ball spacer 300 is mixed with a solvent and sprayed only within the barrier 290 through a nozzle so that the ball spacer 300 is disposed. The solvent evaporates and the ball spacer 300 is disposed within the barrier 290. One to thirty ball spacers 300 can be disposed within the barrier 290. The ball spacer 300 can be disposed within the barrier 290 using an ink-jet method.

The ball spacer 300 is interposed between the first substrate 100 and the second substrate 200 to maintain a cell gap between the first substrate 100 and the second substrate 200. Examples of a material that can be used for the ball spacer 300 include silica and a resin. The diameter of the ball spacer 300 is about 2.5 μm to 6.5 μm.

The first substrate 100 and the second substrate 200 are coupled to each other using a sealing member. LCs are dropped between the first substrate 100 and the second substrate 200, so that the IPS mode LCD device is manufactured.

Unlike the above process, the LC layer 400 is formed on the second substrate 200, and the first substrate 100 and the second substrate 200 are coupled to each other using a sealing member, so that the IPS mode LCD device can be manufactured.

Embodiment 3

Figure 4:
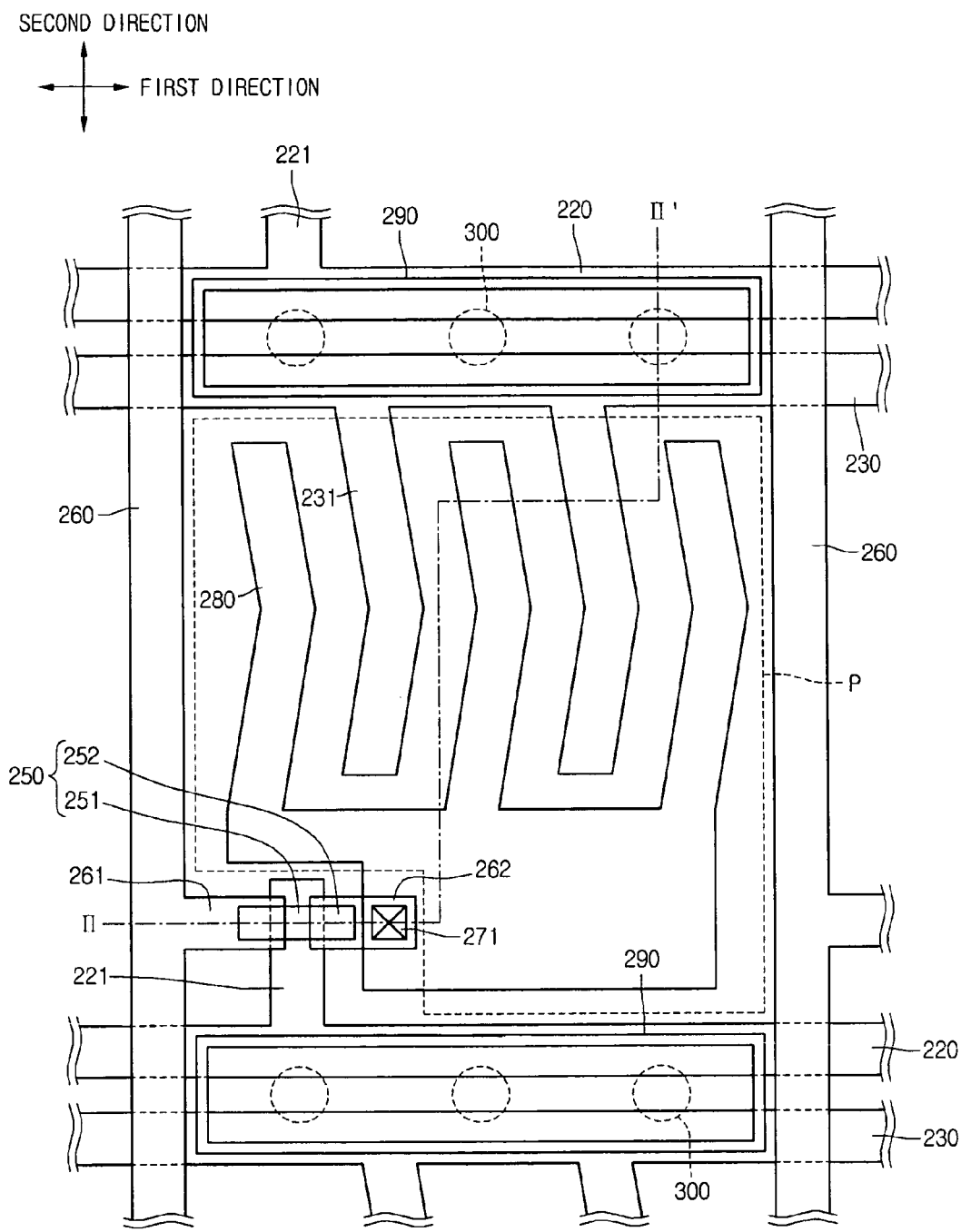
FIG. 4 is a plan view of an IPS mode LCD device according to still another embodiment.
Figure 5:
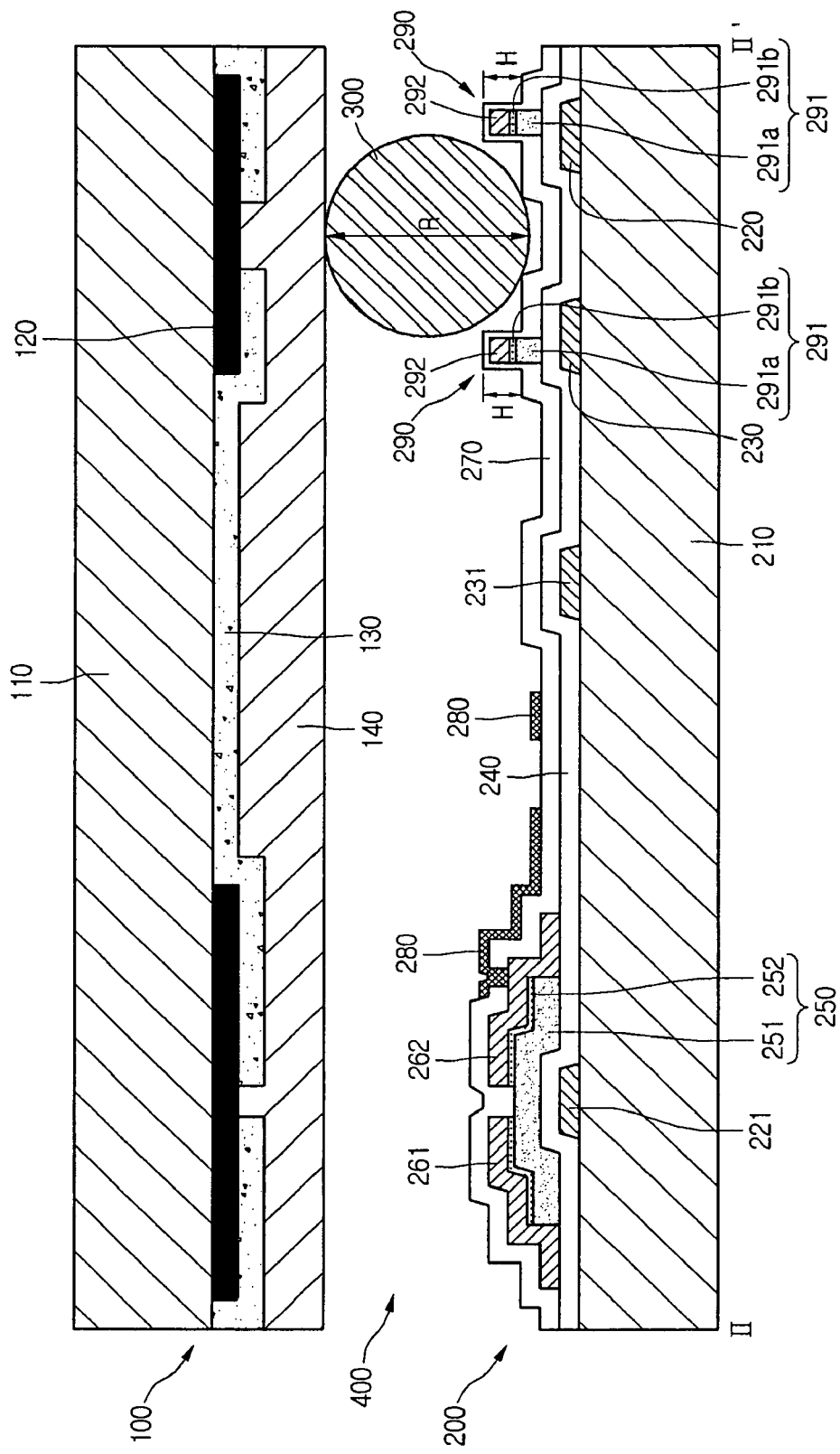
FIG. 5 is a cross-sectional view taken along the line II-II' of FIG. 4.

FIG. 4 is a plan view of an IPS mode LCD device according to still another embodiment, and FIG. 5 is a cross-sectional view taken along the line II-II' of FIG. 4.

Elements of a first substrate are not illustrated in FIG. 4, but FIG. 5 illustrates the elements of the first substrate corresponding to elements of a second substrate. In the embodiment 3, descriptions are made mainly for a barrier and a passivation layer and descriptions of the rest of the elements are omitted.

Referring to FIGS. 4 and 5, the IPS mode LCD device includes a first substrate 100, a second substrate 200, a barrier 290, a ball spacer 300, and an LC layer 400.

The barrier 290 is disposed on an insulating layer 240 to correspond to a BM pattern 120. Also, the barrier 290 has a closed loop shape when seen from a plane, to control the movement of the ball spacer 300 within the barrier 290. The barrier 290 can be disposed to correspond to a gate line 220 or a common line 230.

The barrier 290 includes a first barrier 291 formed in the same layer as that of the channel pattern 250, and a second barrier 292 formed in the same layer as that of a data line 260. The first barrier 291 is formed by sequentially stacking a barrier 291a formed of amorphous silicon, and a barrier 291b formed of amorphous silicon doped with high concentration impurities. The second barrier 292 is disposed on the first barrier 291.

The height H of the barrier 290 is sum of the height of the first barrier 291 and the height of the second barrier 292. The height H of the barrier 290 is about 5% to 80% of the diameter R of the ball spacer 300.

A passivation layer 270 covers the data line 220, the channel pattern 250, a drain electrode 252, the first barrier 291, and the second barrier 292. The passivation layer 270 includes a contact hole 271 exposing a portion of the drain electrode 262. Examples of a material that can be used for the passivation layer 270 include $SiN_x$ and $SiO_x$.

Embodiment 4

Figure 6A:
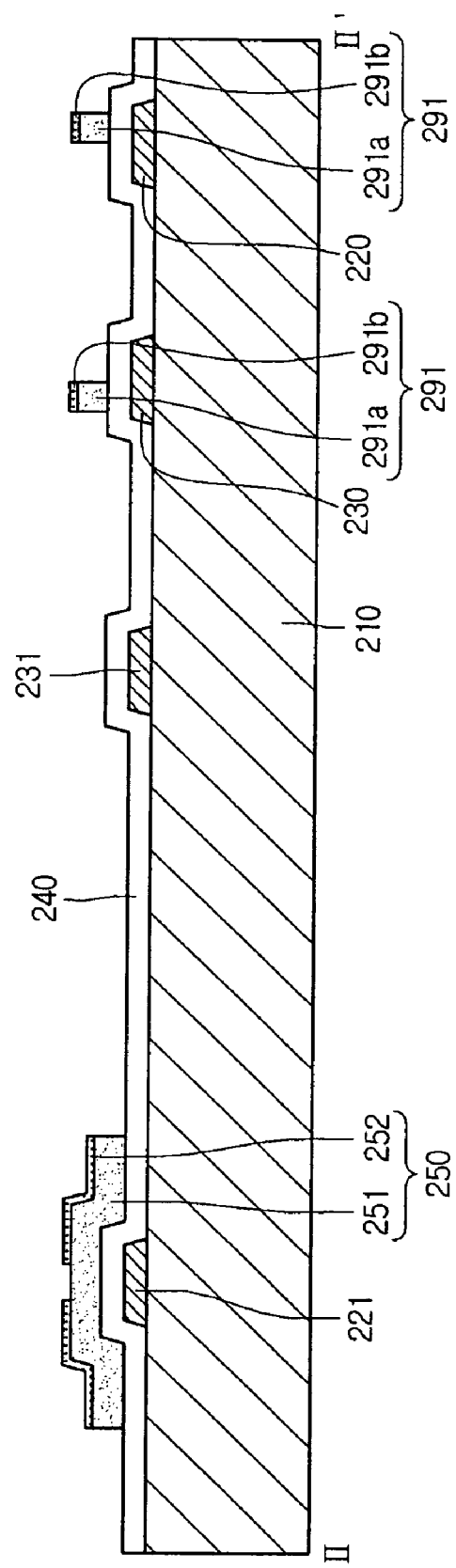
Figure 6B:
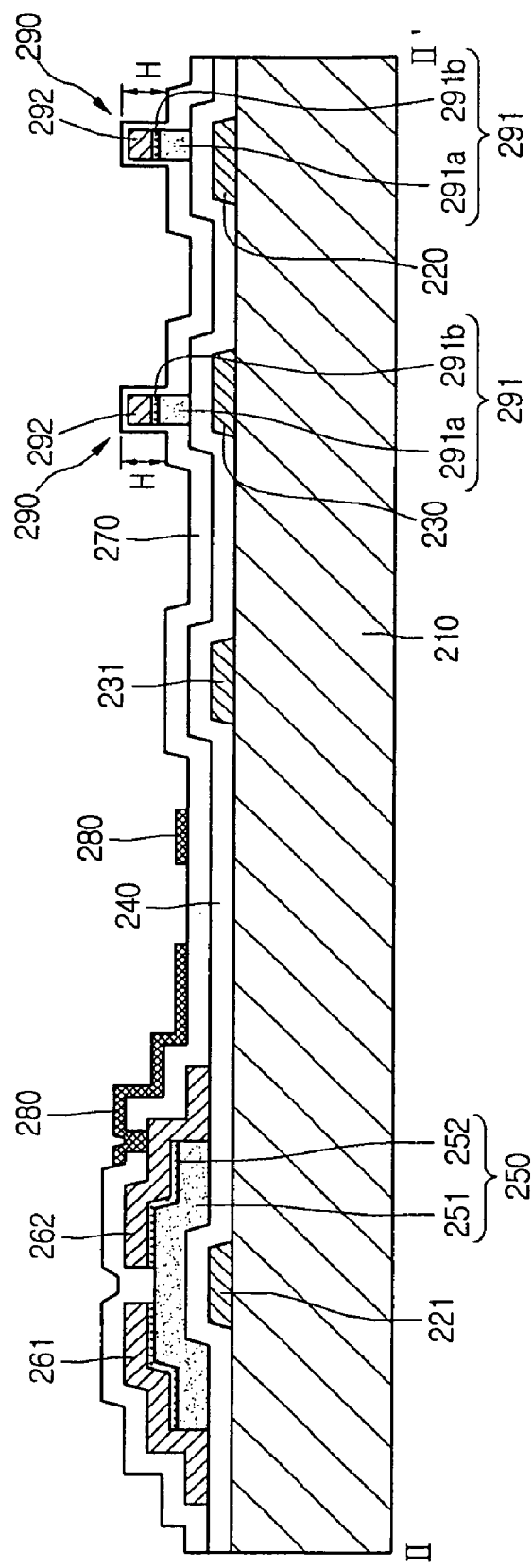

FIGS. 6A to 6C are cross-sectional views illustrating a process of a method for manufacturing an IPS mode LCD device according to still another embodiment. In the embodiment 4, descriptions are made mainly for an operation of forming a channel pattern and a first barrier, and an operation of forming a data line, a drain electrode, and a second barrier, and descriptions for the rest of the operations are omitted.

Referring to FIG. 6A, after a gate line 220 having a gate electrode 221, a common line 230 having a common electrode 231, and an insulating layer 240 are formed on a second base substrate 210, a channel pattern 250, and a first barrier 291 are formed on the insulating layer 240.

To form the channel pattern 250 and the first barrier 291, an amorphous silicon thin film and an n+ amorphous silicon thin film doped with high concentration impurities are sequentially deposited. After that, a photoresist film is formed on the entire surface of the n+ amorphous silicon thin film, and patterned through a photolithography process, to form a photoresist pattern having a shape corresponding to the channel pattern 250 and the first barrier 291 on the n+ amorphous silicon thin film.

After that, the amorphous silicon thin film and the n+ amorphous silicon thin film are patterned using the photoresist pattern as an etch mask to form the channel pattern 250 and the first barrier 291 on the insulating layer 240.

The channel pattern 250 includes an amorphous silicon pattern 251 and an n+ amorphous silicon pattern 252. The channel pattern 250 is formed to correspond to the gate electrode 221. A pair of n+ amorphous silicon patterns 252 separated from each other by a predetermined distance are formed on the amorphous silicon pattern 251.

The first barrier 291 is formed by sequentially stacking a barrier 291a formed of amorphous silicon, and a barrier 291b formed of amorphous silicon doped with high concentration.

Referring to FIG. 6B, after the channel pattern 250 and the first barrier 291 are formed, a data line 260, a drain electrode 262, and a second barrier 292 are formed.

To form the data line 260, the drain electrode 262, and the second barrier 292, a source/drain metal layer is formed on the entire surface of the insulating layer 240. A photoresist film is formed on the entire surface of the source/drain metal layer. The photoresist film is patterned through a photolithography process to form a photoresist pattern. The source/drain metal layer is patterned using the photoresist pattern as an etch mask to form the data line 260 and the drain electrode 262 on the insulating layer 240. Simultaneously, the second barrier 292 is formed on the first barrier 261.

The data line 260 crosses the gate line 220 to define a pixel region P. The data line 260 includes a source electrode 261. The source electrode 261 is electrically connected to one of the pair of n+ amorphous silicon patterns 252, and separated from the drain electrode 262. The drain electrode 262 is formed on the other of the pair of n+ amorphous silicon patterns 252.

After the data line 260, the drain electrode 262, and the second barrier 292 are formed, a passivation layer 280 covering the data line 260, the drain electrode 262, and the second barrier 292, and a pixel electrode 280 electrically connected to the drain electrode 262 are formed.

Through the above process, the barrier 290 including the first barrier 291 and the second barrier 292 is formed. The height H of the barrier 290 is sum of the height of the first barrier 291 and the height of the second barrier 292. The height H of the barrier 290 is about 5% to 80% of the diameter R of a ball spacer 300.

The barrier 290 is formed to correspond to a BM pattern 120 and has a closed loop shape. The barrier 290 controls the movement of the ball spacer 300 within the barrier 290. The barrier 290 can be formed to correspond to the gate line 220 or the common line 230.

Referring to FIG. 6C, after the barrier 290 is formed, the ball spacer 300 is disposed within the barrier 290. The first substrate 100 and the second substrate 200 are coupled to each other using a sealing member. LCs are dropped between the first substrate 100 and the second substrate 200, so that the IPS mode LCD device is manufactured.

Unlike this, an LC layer 400 can be formed on the second substrate 200, and then the first substrate 100 and the second substrate 200 can be coupled to each other using a sealing member.

Embodiment 5

Figure 7:
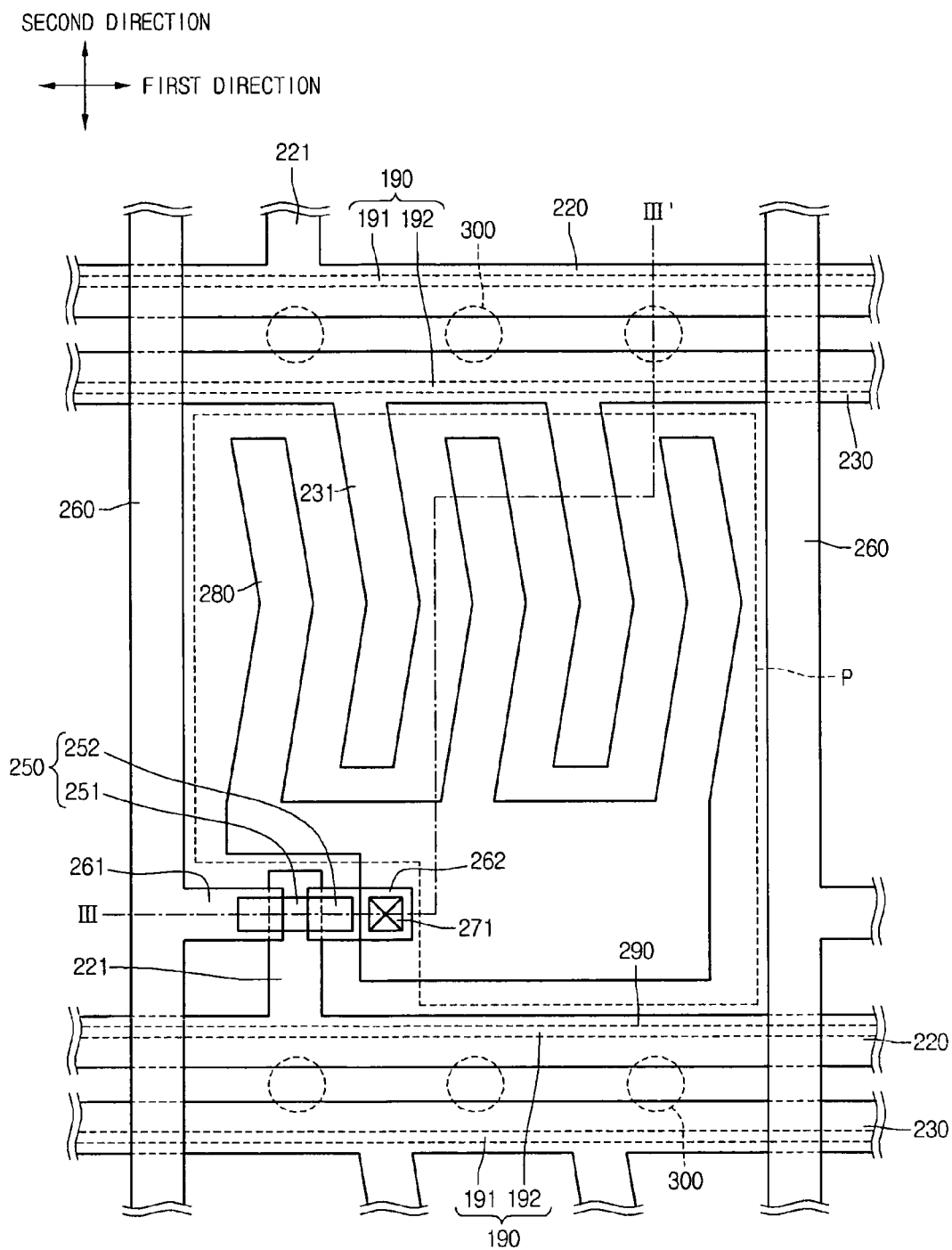
FIG. 7 is a plan view of an IPS mode LCD device according to still another embodiment.
Figure 8:
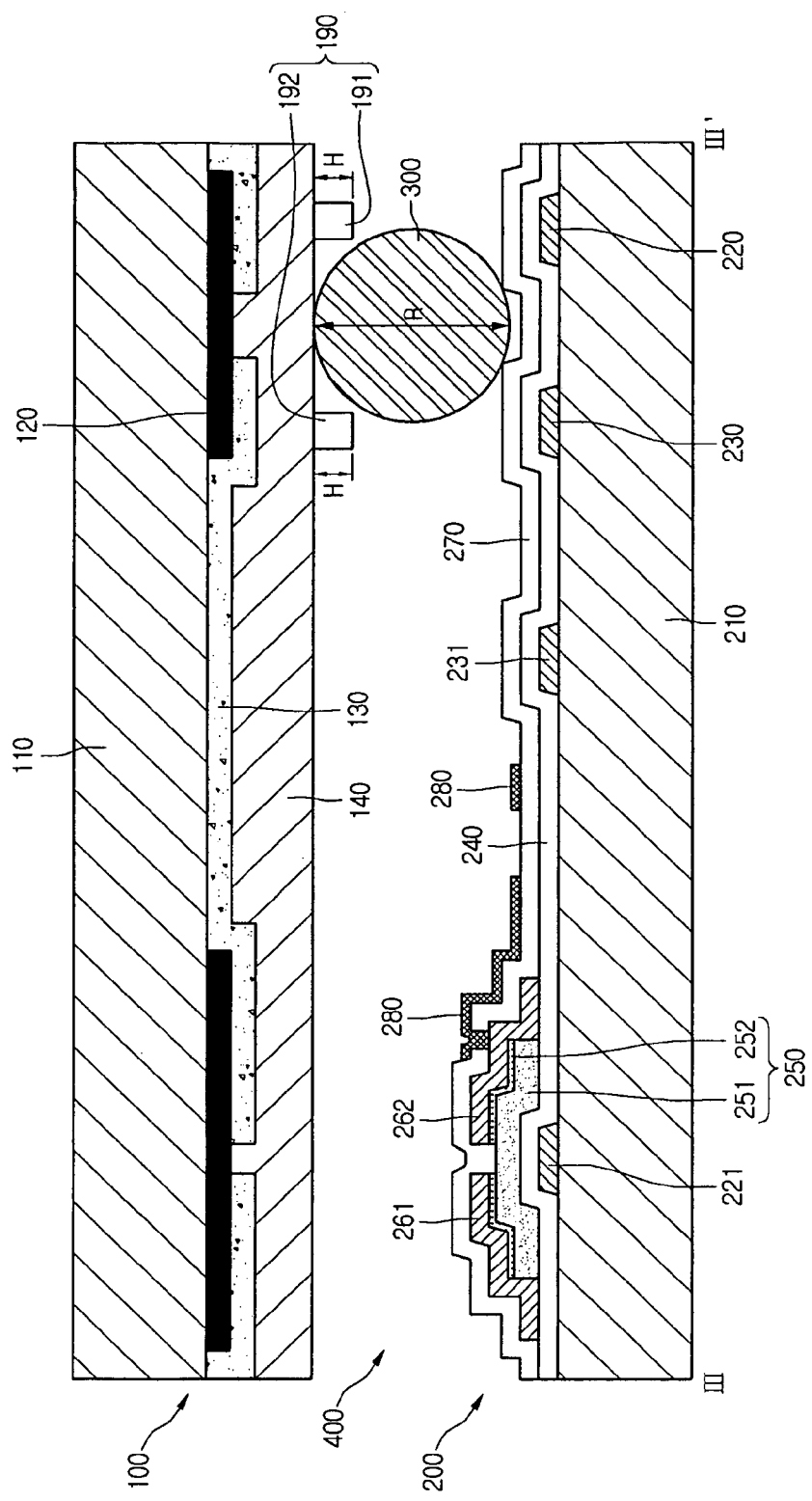
FIG. 8 is a cross-sectional view taken along the line III-III' of FIG. 7.

FIG. 7 is a plan view of an IPS mode LCD device according to still another embodiment, and FIG. 8 is a cross-sectional view taken along the line III-III' of FIG. 7. Elements of a first substrate are not illustrated in FIG. 7, but FIG. 8 illustrates the elements of the first substrate corresponding to elements of a second substrate.

In the embodiment 5, descriptions are made mainly for a barrier and a ball spacer and descriptions of the rest of the elements are omitted.

A barrier 190 is disposed on an overcoat layer 140 to correspond to a BM pattern 120. The barrier 190 includes a gate barrier 191 corresponding to a gate line 220, and a common barrier 192 corresponding to a common line 230. The barrier 190 has an opened loop shape when seen from a plane.

Examples of a material that can used for the barrier 290 include $SiN_x$, $SiO_x$, Al, an Al alloy, Cu, BCB, and an acryl-based material. The height H of the barrier 190 is about 5% to 80% of the diameter R of a ball spacer 300, which will be described below.

The ball spacer 300 is interposed between the first substrate 100 and the second substrate 200 to maintain a cell gap between the first substrate 100 and the second substrate 200. Examples of a material that can be used for the ball spacer 300 include silica and a resin. The radius R of the ball spacer 300 is about 2.5 μm to 6.5 μm.

The ball spacer 300 is disposed on a portion of a region corresponding to the BM pattern 120 between the gate barrier 191 and the common barrier 192. The barrier 190 controls the movement of the ball spacer 300 within a region between the gate barrier 191 and the common barrier 192. Therefore, barrier 190 prevents the ball spacer 300 from moving to a pixel region P during a process of manufacturing the IPS mode LCD device. Therefore, a limitation that the ball spacer 300 moves to the pixel region P to reduce an aperture ratio and generate light leakage can be resolved.

Embodiment 6

Figure 9A:
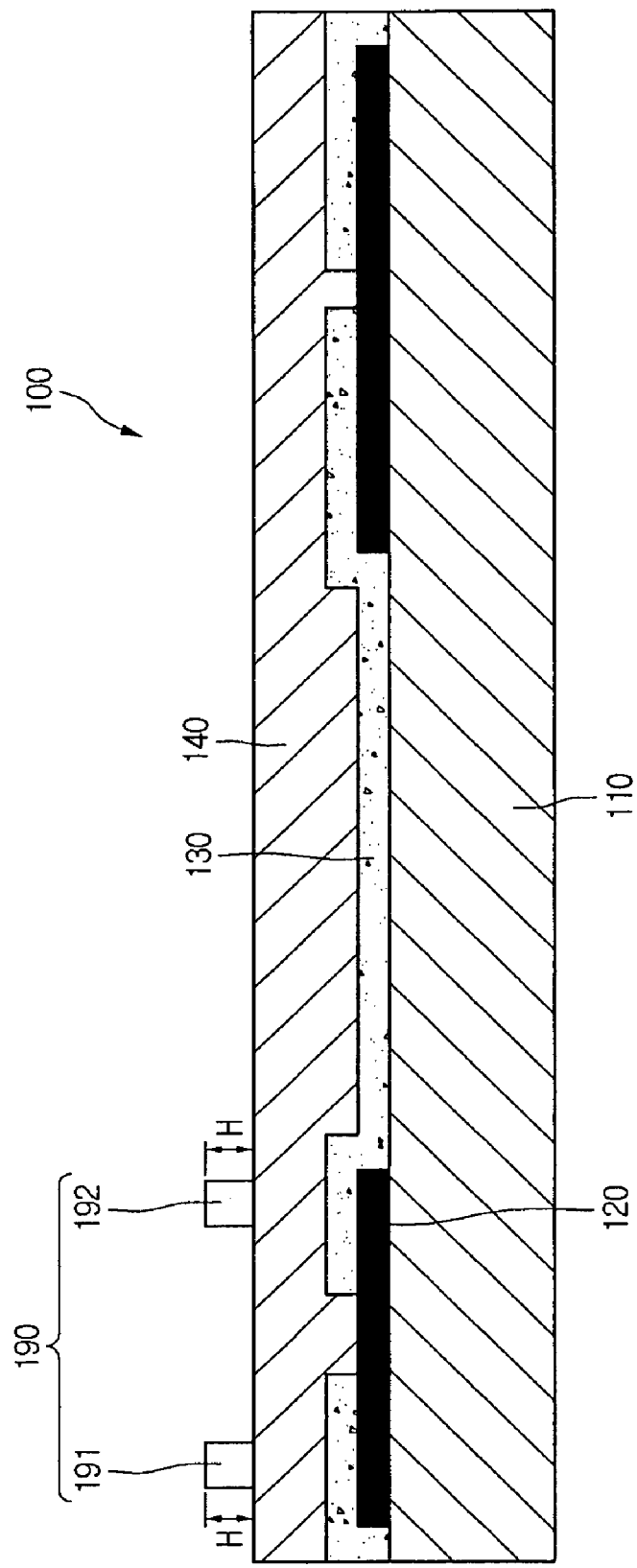
FIGS. 9A to 9B are cross-sectional views illustrating a process of a method for manufacturing an IPS mode LCD device according to still another embodiment.
Figure 9B:
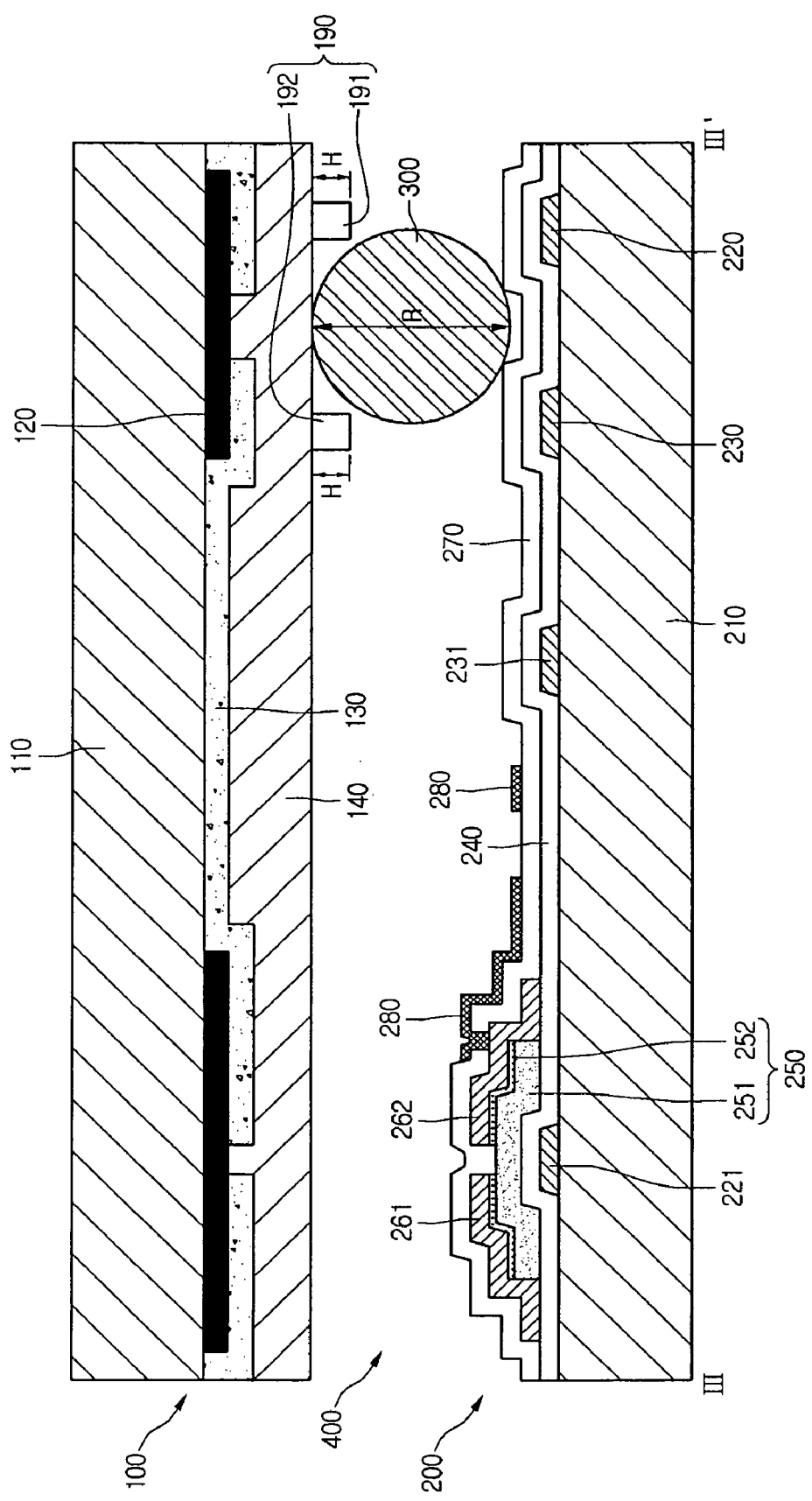

FIGS. 9A to 9B are cross-sectional views illustrating a process of a method for manufacturing an IPS mode LCD device according to still another embodiment.

In the embodiment 6, descriptions are made mainly for an operation of forming a barrier and an operation of disposing a ball spacer, and descriptions of the rest of the operations are omitted.

Referring to FIG. 9A, after a BM pattern 120, a color filter pattern 130, and an overcoat layer 140 are formed on a first base substrate 110, a barrier 190 is formed on the overcoat layer 140.

To form the barrier 190, an organic layer including a photoresist is formed on the entire surface of the overcoat layer 140. The height H of the organic layer can be about 5% to 80% of the diameter R of a ball spacer 300, which will be described later. Examples of a material that can used for the ball spacer include BCB including a photoresist, and an acryl-based material. After the organic layer is formed, the organic layer is patterned through a photolithography including an exposure process and a developing process to form the barrier 190 on the overcoat layer 140. The barrier 190 can be cured using heat and/or light.

The barrier 190 corresponds to the BM pattern 120. The barrier 190 includes a gate barrier 191 corresponding to a gate line 220, and a common barrier 192 corresponding to a common line 230.

Through the above process, the barrier 190 is formed on a first substrate 100 including the first base substrate 110, the BM pattern 120, the color filter pattern 130, and the overcoat layer 140.

Referring to FIG. 9B, after the barrier 190 is formed, the ball spacer 300 is disposed on a portion of a region corresponding to the BM pattern 120 between the gate barrier 191 and the common barrier 192.

The ball spacer 300 is mixed with a solvent and sprayed to only the portion of the region corresponding to the BM pattern 120 between the gate barrier 191 and the common barrier 192 through a nozzle so that the ball spacer 300 is disposed. The solvent evaporates and the ball spacer 300 is disposed between the gate barrier 191 and the common barrier 192.

Examples of a material that can be used for the ball spacer 300 include silica and a resin. The diameter of the ball spacer 300 is about 2.5 μm to 6.5 μm.

After the ball spacer 300 is disposed, a second substrate 200 is formed. The first substrate 100 and the second substrate 200 are coupled to each other using a sealing member.

The ball spacer 300 is interposed between the first substrate 100 and the second substrate 200 to maintain a cell gap between the first substrate 100 and the second substrate 200.

LCs are interposed between the first substrate 100 and the second substrate 200, so that the IPS mode LCD device is manufactured.

Embodiment 7

Figure 10:
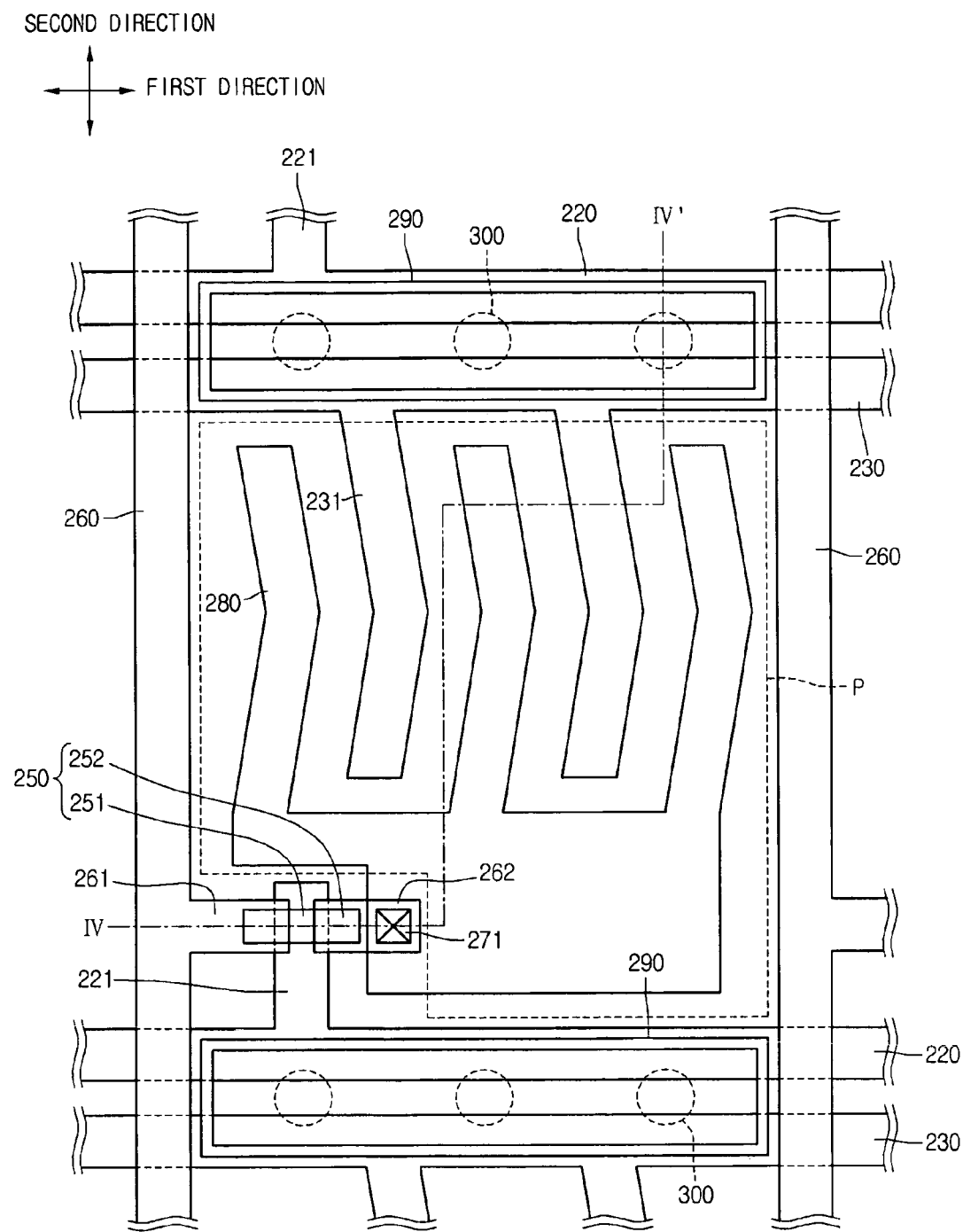
FIG. 10 is a plan view of an IPS mode LCD device according to still another embodiment.

FIG. 10 is a plan view of an IPS mode LCD device according to still another embodiment, and FIG. 11 is a cross-sectional view taken along the line IV-IV' of FIG. 10. Elements of a first substrate are not illustrated in FIG. 10, but FIG. 11 illustrates the elements of the first substrate corresponding to elements of a second substrate. In the embodiment 7, descriptions are made mainly for a barrier and a ball spacer and descriptions of the rest of the elements are omitted.

The IPS mode LCD device includes a first substrate 100, a second substrate 200, an upper barrier 190 disposed on the first substrate 100, a lower barrier 290 disposed on the second substrate 200, and a ball spacer 300 interposed between the first substrate 100 and the second substrate 200.

The upper barrier 190 is disposed on an overcoat layer 140 to correspond to a BM pattern 120. The height H1 of the upper barrier 190 is about 5% to 80% of the diameter R of the ball spacer, which will be described later. Examples of a material that can be used for the upper barrier 190 include Al, an Al alloy, Cu, $SiO_x$, $SiN_x$, BCB, and an acryl-based material. The upper barrier has a closed loop shape.

The lower barrier 290 is disposed on a passivation layer 270 to correspond to the upper barrier 190. Like the upper barrier, the lower barrier 290 has a closed loop shape. The height H2 of the lower barrier 290 is about 5% to 80% of the diameter R of the ball spacer, which will be described later. Examples of a material that can be used for the lower barrier 290 include Al, an Al alloy, Cu, BCB, and an acryl-based material.

Unlike the above description, the upper barrier 190 and the lower barrier 290 can have an opened loop shape.

Unlike the above description, the upper barrier 190 can have an opened loop shape and the lower barrier 290 can have a closed loop shape.

The ball spacer 300 is interposed between the first substrate 100 and the second substrate 200 to maintain a cell gap between the first substrate 100 and the second substrate 200.

The ball spacer 300 is disposed within the upper barrier 190 and the lower barrier 290. The upper barrier 190 and the lower barrier 290 control the movement of the ball spacer 300 within the upper barrier 190 and the lower barrier 290. The upper barrier 190 and the lower barrier 290 prevent the ball spacer 300 from moving to a pixel region P during a process of manufacturing the IPS mode LCD device, so that the an aperture ratio is improved and light leakage is prevented.

Embodiment 8

Figure 12A:
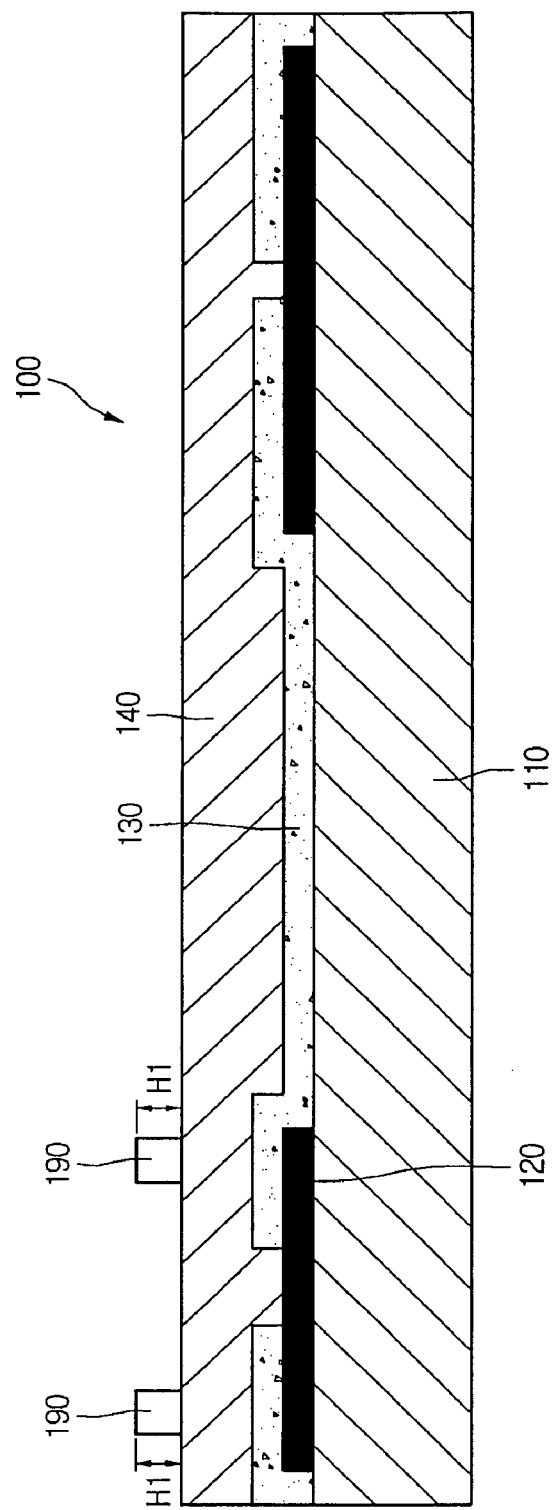
FIGS. 12A to 12B are cross-sectional views illustrating a process of a method for manufacturing an IPS mode LCD device according to still another embodiment.
Figure 12B:
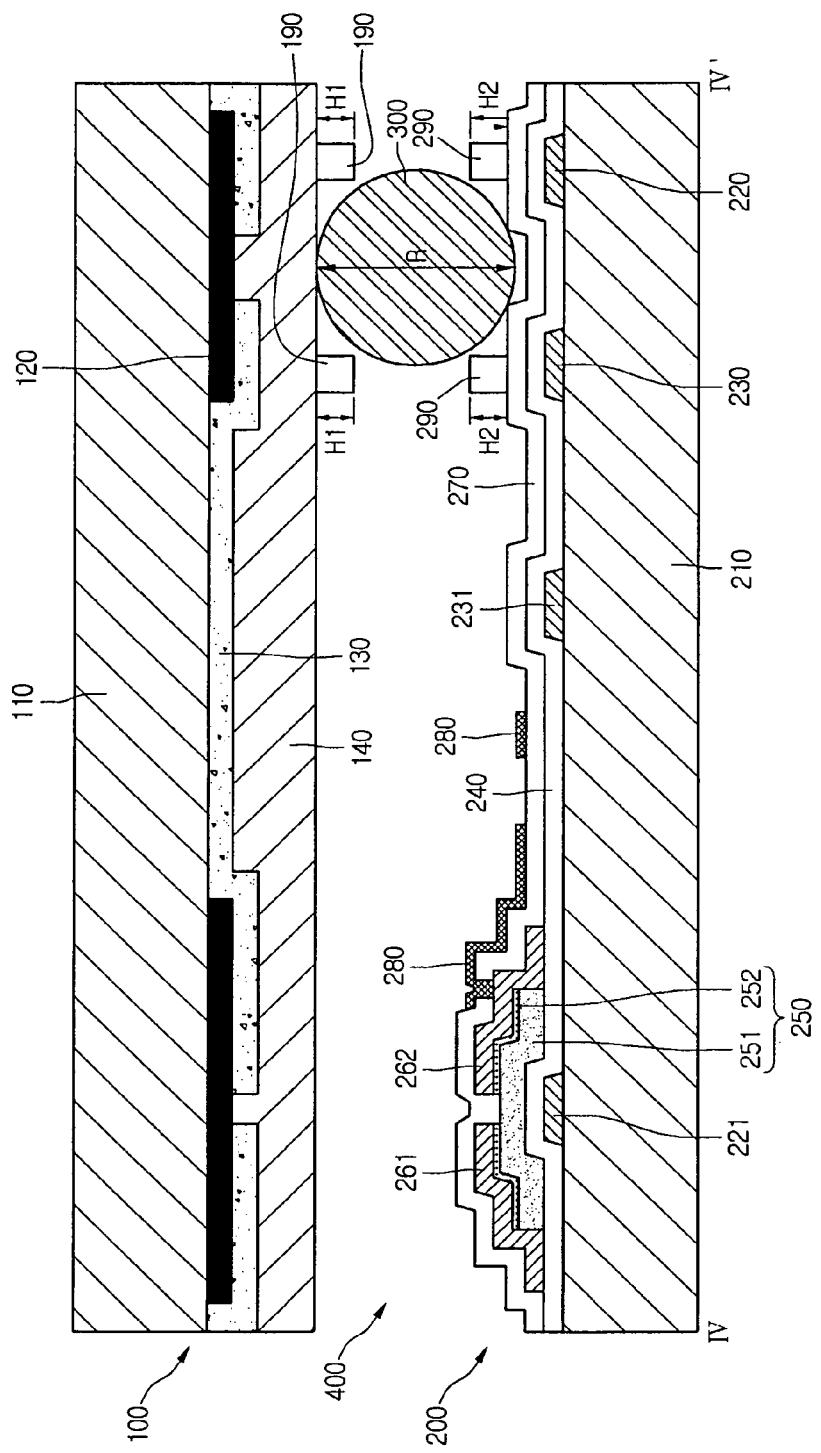

FIGS. 12A to 12B are cross-sectional views illustrating a process of a method for manufacturing an IPS mode LCD device according to still another embodiment. In the embodiment 8, descriptions are made mainly for an operation of forming a barrier and an operation of forming a ball spacer, and descriptions of the rest of the elements are omitted.

Referring to FIG. 12A, after a BM pattern 120, a color filter pattern 130, and an overcoat layer 140 are formed on a first base substrate 110, an upper barrier 190 is formed on the overcoat layer 140.

To form the upper barrier 190, an organic layer including a photoresist is formed on the entire surface of the overcoat layer 140. The thickness H1 of the organic layer can be about 5% to 80% of the diameter R of a ball spacer 300, which will be described later. Examples of a material that can be used for the organic layer include BCB and an acryl-based material. After the organic layer is formed, the organic layer is patterned through a photolithography including an exposure process and a developing process to form the upper barrier 190 on the overcoat layer 140. The upper barrier 190 can be cured using heat and/or light.

When seen from a plane, the upper barrier 190 has a closed loop shape and corresponds to the BM pattern 120. Unlike this, the upper barrier 190 can have an opened loop.

Referring to FIG. 12B, after a gate line 220, a common line 230, an insulating layer 240, a channel pattern 250, a data line 260, a drain electrode 262, a passivation layer 270, and a pixel electrode 280 are formed on a second base substrate 210, a lower barrier 290 is formed on the passivation layer 270.

To form the lower barrier 290, an organic layer including a photoresist is formed on the entire surface of the passivation layer 270. The thickness H2 of the organic layer can be about 5% to 80% of the diameter R of the ball spacer 300, which will be described later. Examples of a material that can be used for the organic layer include BCB and an acryl-based material. After the organic layer is formed, the organic layer is patterned through a photolithography including an exposure process and a developing process to form the lower barrier 290 on the passivation layer 270. The lower barrier 290 can be cured using heat and/or light.

The lower barrier 290 is formed to correspond to the upper barrier 190. Like the upper barrier 190, the lower barrier 290 has a closed loop shape when seen from a plane.

Unlike this, the lower barrier 290 can have an opened loop shape when seen from a plane.

After the lower barrier 290 is formed, the ball spacer 300 is disposed within the lower barrier 290 on the second substrate 200.

The ball spacer 300 is mixed with a solvent and sprayed only within the lower barrier 290 through a nozzle so that the ball spacer 300 is disposed. The solvent evaporates and the ball spacer 300 is disposed within the lower barrier 290. One to thirty ball spacers 300 can be disposed within the lower barrier 290. The ball spacer 300 can be disposed within the upper barrier 190 and the lower barrier 290 using an ink-jet method.

The ball spacer 300 is interposed between the first substrate 100 and the second substrate 200 to maintain a cell gap between the first substrate 100 and the second substrate 200. Examples of a material that can be used for the ball spacer 300 include silica and a resin. The radius R of the ball spacer 300 is about 2.5 μm to 6.5 μm.

The first substrate 100 and the second substrate 200 are coupled to each other using a sealing member. LCs are dropped between the first substrate 100 and the second substrate 200, so that the IPS mode LCD device is manufactured.

Embodiment 9

Figure 13:
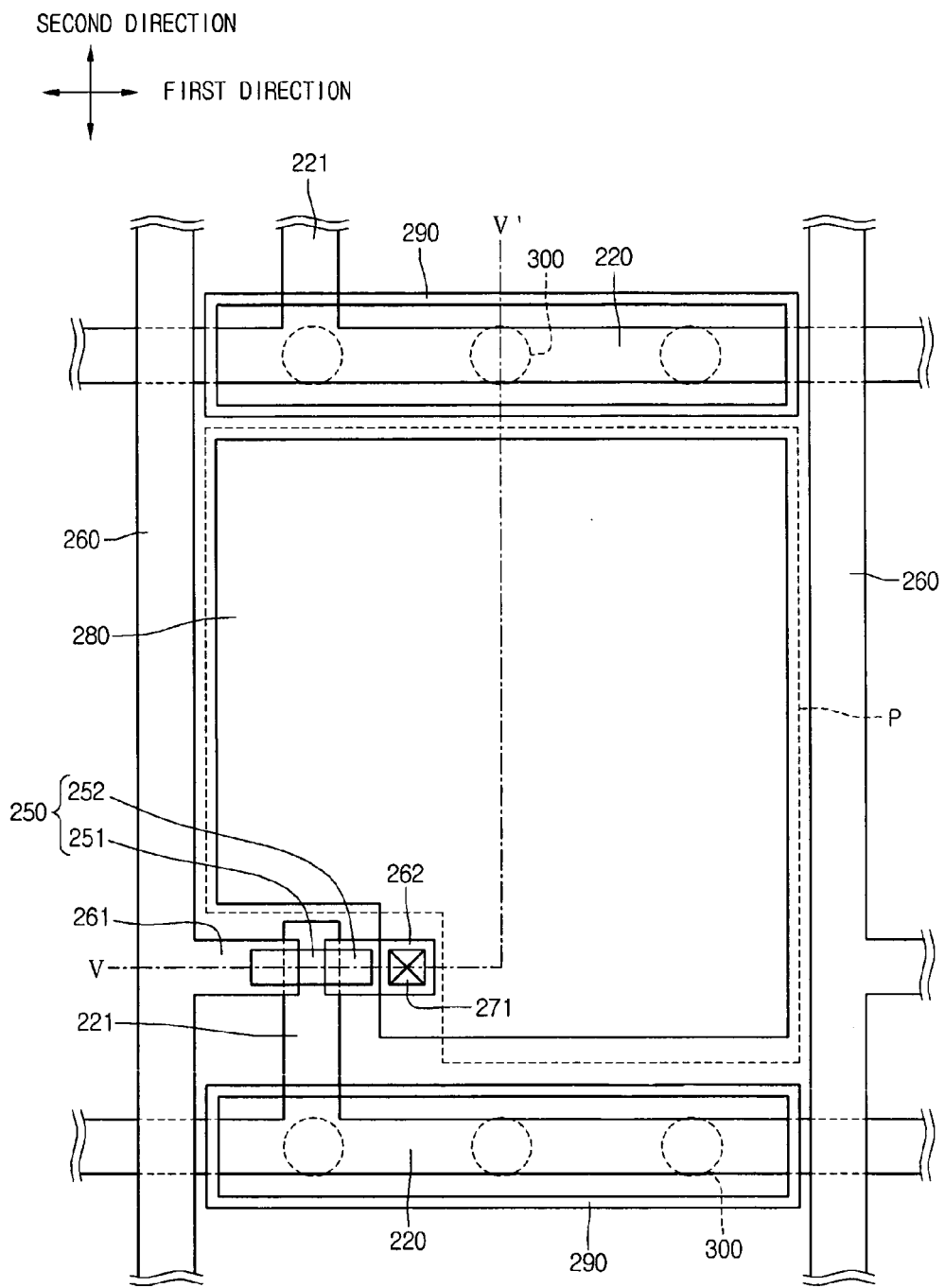
FIG. 13 is a plan view of a TN mode LCD device according to still another embodiment.
Figure 14:
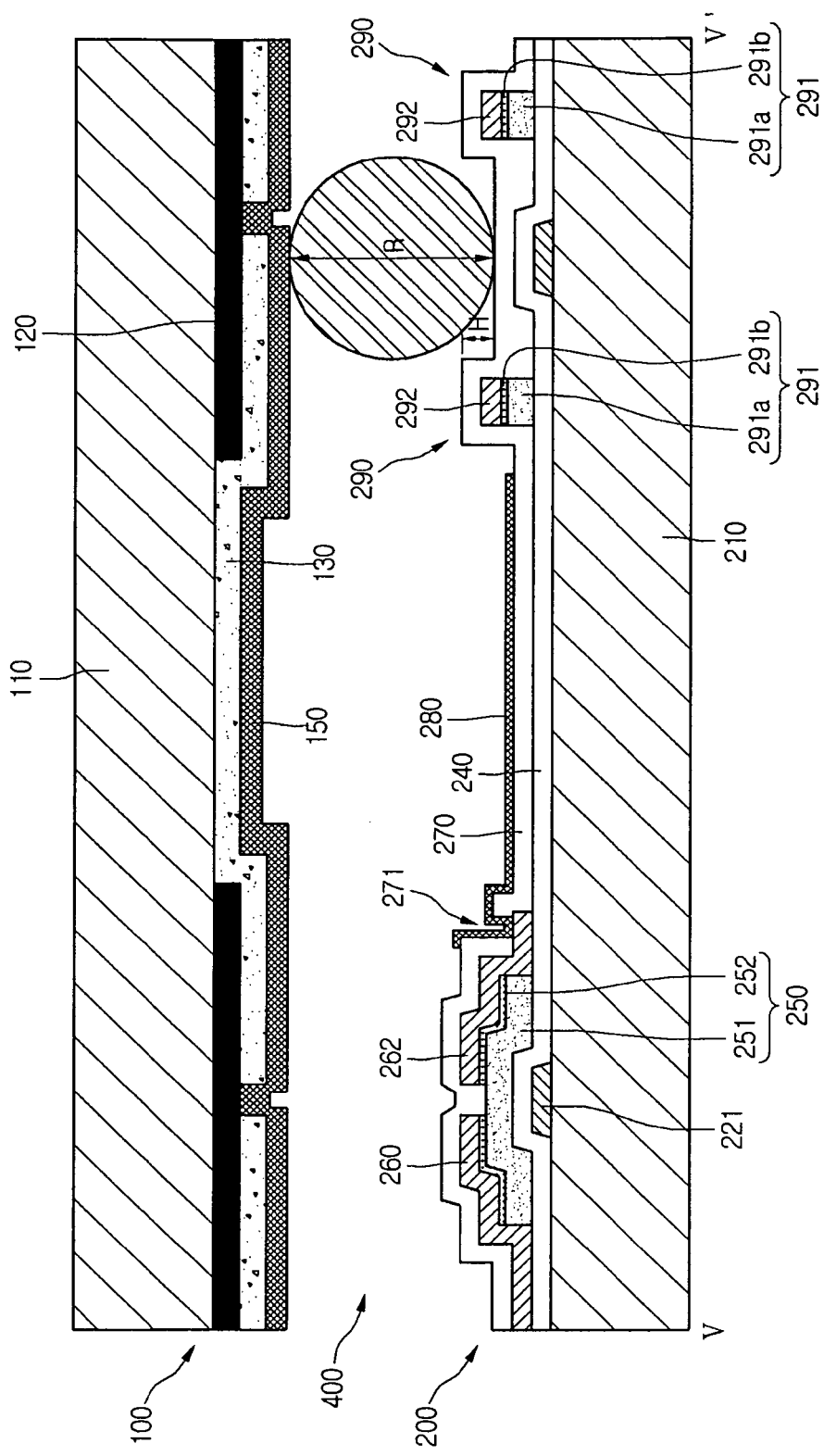
FIG. 14 is a cross-sectional view taken along the line V-V' of FIG. 13.

FIG. 13 is a plan view of a TN mode LCD device according to still another embodiment, and FIG. 14 is a cross-sectional view taken along the line V-V' of FIG. 13. Elements of a first substrate are not illustrated in FIG. 13, but FIG. 14 illustrates the elements of the first substrate corresponding to elements of a second substrate.

Referring to FIGS. 13 and 14, a twisted nematic (TN) mode LCD device includes a first substrate 100, a second substrate 200, a barrier 290, a ball spacer 300, and an LC layer 400.

The first substrate 100 includes a first base substrate 110, a BM pattern 120, a color filter pattern 130, and a common electrode 150.

The first base substrate 110 is a transparent insulator. The first base substrate 110 can be a glass substrate, for example.

The BM pattern 120 is disposed on the first base substrate 110. The BM pattern 120 has a grating-shaped structure including openings when seen from a plane. The BM pattern 120 blocks light.

The color filter pattern 130 is disposed on the openings. The color filter pattern 130 includes a red color filter pattern, a green color filter pattern, and a blue color filter pattern.

The common electrode 150 is disposed on the first base substrate 110 on which the BM pattern 120 and the color filter pattern 130 have been disposed. A common voltage is applied to the common electrode 150.

The second substrate 200 includes a second base substrate 210, a gate line 220, an insulating layer 240, a channel pattern 250, a data line 260, a drain electrode 262, a passivation layer 270, and a pixel electrode 280.

The second base substrate 210 is transparent insulator. The second base substrate 210 can be a glass substrate or a quartz substrate, for example.

The gate line 220 is disposed in a first direction on the second base substrate 210. The gate line 220 includes a gate electrode 221. The gate electrode 221 branches from the gate line 220. A gate signal is applied to the gate electrode through the gate line 220.

The insulating layer 240 is disposed on the second base substrate 210 on which the gate line 220 has been disposed. The insulating layer 240 covers the gate line 220 to insulate the gate line 220.

The channel pattern 250 is disposed on the insulating layer 240. The channel pattern 250 includes an amorphous silicon pattern 251 and an n+ amorphous silicon pattern 252. The channel pattern 250 is disposed to correspond to the gate electrode 221.

The amorphous silicon pattern 251 is disposed on the insulating layer 240. Examples of a material that can be used for the amorphous silicon pattern 251 include amorphous silicon.

A pair of n+ amorphous silicon patterns 252 separated from each other is disposed on the amorphous silicon pattern 251. Examples of a material that can be used for the n+ amorphous silicon pattern 252 include amorphous silicon doped with high concentration impurities.

The data line 262 crosses the gate line in a second direction on the insulating layer 240 to define a pixel region P. The data line 260 includes a source electrode 261 formed on one of the pair of n+ amorphous silicon patterns 252.

The drain electrode 262 is separated from the source electrode 261. The drain electrode 262 is formed on the other of the pair of n+ amorphous silicon patterns 252. A material that can be used for the drain electrode 262 is the same as that used for the data line 260.

The passivation layer 270 covers the channel pattern 250, the data line 260, and the drain electrode 262. The passivation layer 270 includes a contact hole exposing a portion of the drain electrode 262.

The pixel electrode 280 is disposed on a portion of the passivation layer 270 corresponding to the pixel region P. The pixel electrode 280 is electrically connected to the drain electrode 262. A data voltage is applied to the pixel electrode 280 through the data line 260 and the drain electrode 262.

A barrier 290 is disposed on the insulating layer 240. The barrier 290 is disposed to the BM pattern 120 and has a closed loop shape. The barrier 290 can be disposed to correspond to the gate line 220. Examples of a material that can be used for the barrier 290 include Al, an Al alloy, Cu, BCB, and an acryl-based material. The height H of the barrier 290 is about 5% to 80% of the diameter R of a ball spacer 300, which will be described later.

The barrier 290 includes a first barrier 291 formed in the same layer as that of the channel pattern 250, and a second barrier 292 formed in the same layer as that of the data line 260. The first barrier 291 is formed by sequentially stacking a barrier 291a formed of amorphous silicon, and a barrier 291b formed of amorphous silicon doped with high concentration impurities. The second barrier 292 is disposed on the first barrier 291.

The ball spacer 300 is interposed between the first substrate 100 and the second substrate 200 to maintain a cell gap between the first substrate 100 and the second substrate 200. The movement of the ball spacer 300 is fixed within the barrier 290 by the barrier 290.

Examples of a material that can be used for the ball spacer 300 include silica and a resin. The radius R of the ball spacer 300 is about 2.5 μm to 6.5 μm.

The movement of the ball spacer 300 is controlled within the barrier 290 by the barrier 290. The barrier 290 is formed to correspond to the BM pattern 120. Therefore, the barrier 290 prevents the ball spacer 300 from moving to the pixel region P during a process of manufacturing the TN mode LCD device. Therefore, a limitation that the ball spacer 300 moves to the pixel region P to reduce an aperture ratio and generate light leakage can be resolved.

The LC layer 400 is interposed between the first substrate 100 and the second substrate 200. The LCs of the LC layer 400 are aligned by a potential difference between a common voltage applied to the common electrode 150 and a data voltage applied to the pixel electrode 280. Light intensity passing through the LC layer 400 changes depending on the potential difference, so that the TN mode LCD device can display an image.

Embodiment 10

FIGS. 15A to 15E are cross-sectional views illustrating a process of a method for manufacturing a TN mode LCD device according to still another embodiment.

Figure 15A:
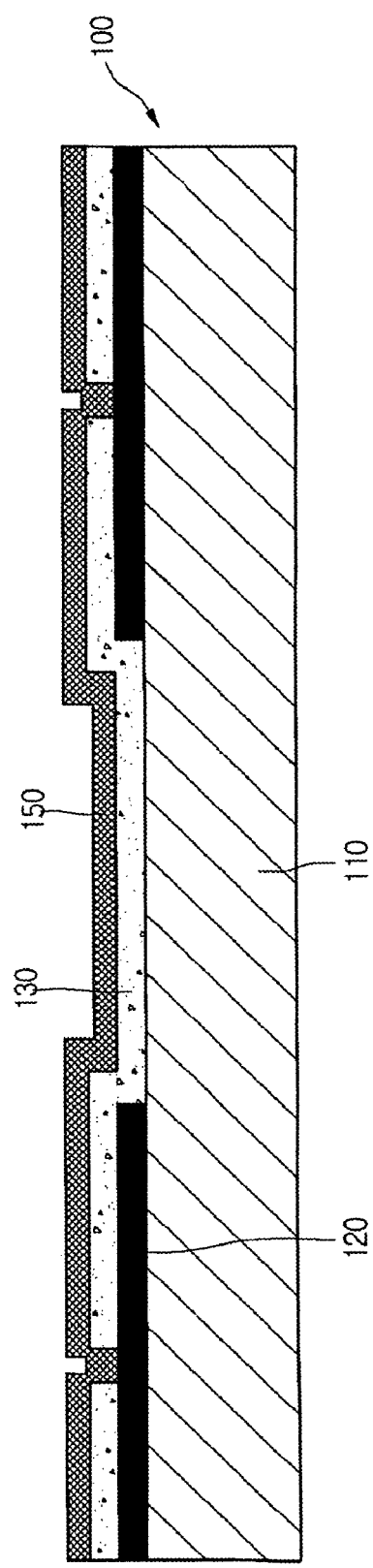
FIGS. 15A to 15E are cross-sectional views illustrating a process of a method for manufacturing a TN mode LCD device according to still another embodiment.

Referring to FIG. 15A, a BM pattern 120, a color filter pattern 130, and a common electrode 150 are formed on a first base substrate 110.

The first base substrate 110 is a transparent insulator. The first base substrate 110 can be a glass substrate, for example.

To form the BM pattern 120, a light blocking layer including a photoresist is formed on the first base substrate 110. Examples of a material that can be used for the light blocking layer includes a black resin. After the light blocking layer is formed, the light blocking layer is patterned through a photolithography process including an exposure process and a developing process to form the BM pattern 120 having a grating shape when seen from a plane on the first base substrate 110. The BM pattern 120 can be cured using heat and/or light.

The BM pattern 120 has a grating-shaped structure having openings when seen from a plane.

After the BM pattern 120 is formed, the color filter pattern 130 is formed on the openings. The edges of the color filter pattern 130 overlap a portion of the BM pattern 120.

After the color filter pattern 130 is formed, the common electrode 150 is formed on the first base substrate 110 on which the BM pattern 120 and the color filter pattern 130 have been formed.

To form the common electrode 150, transparent conductive metal is deposited on the first base substrate 110 using chemical vapor deposition (CVD) or a sputtering process.

Figure 15B:
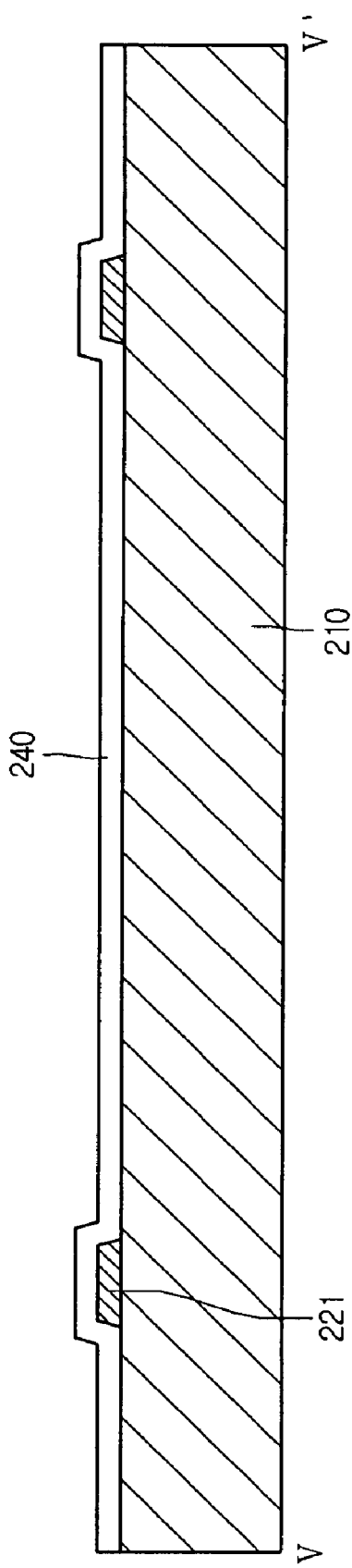

Referring to FIG. 15B, a gate line 220 and an insulating layer 240 insulating the gate line 220 are sequentially formed on a second base substrate 210.

The second base substrate 210 is transparent insulator. The second base substrate 210 can be a glass substrate or a quartz substrate, for example.

To form the gate line 220, a metal layer is formed on the entire surface of the second base substrate 210. After the metal layer is formed, a photoresist film is formed on the entire surface of the metal layer. The photoresist film is patterned through a photolithography process including an exposure process and a developing process to form a photoresist pattern on the metal layer. The photoresist pattern has a shape corresponding to the gate line 220. The metal layer is patterned using the photoresist pattern as an etch mask to form the gate line 220 on the second base substrate 210.

The gate line 220 includes a gate electrode 221. The gate electrode 221 corresponds to a channel pattern 250, and branches from the gate line 220.

After the gate line 220 is formed, the insulating layer 240 insulating the gate line 220 is formed on the second base substrate 210.

Figure 15C:
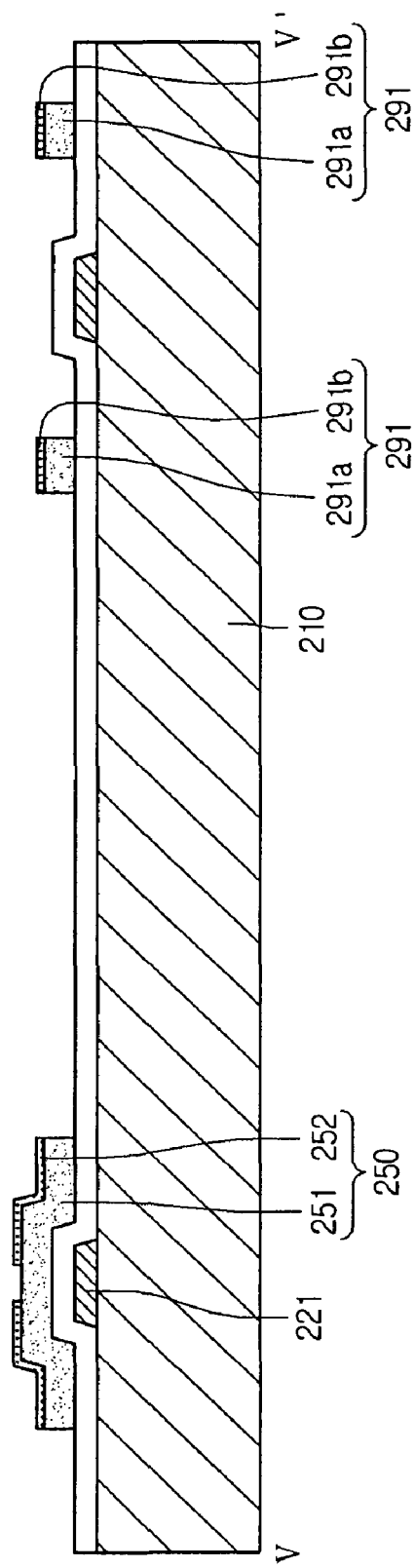

Referring to FIG. 15C, after the gate line 220 and the insulating layer 240 are formed, the channel pattern 250 and a first barrier 291 are formed on the insulating layer 240.

To form the channel pattern 250 and the first barrier 291, an amorphous silicon thin film and an n+ amorphous silicon thin film are sequentially formed on the insulating layer 240. Examples of a material that can be used for the amorphous silicon thin film include amorphous silicon. Examples of a material that can be used for the n+ amorphous silicon thin film include amorphous silicon doped with high concentration amorphous silicon. After that, a photoresist film is formed on the entire surface of the n+ amorphous silicon thin film, and patterned through a photolithography including an exposure process and a developing process to form a photoresist pattern having a shape corresponding to the channel pattern 250 on the n+ amorphous silicon thin film. The amorphous silicon thin film and the n+ amorphous silicon thin film are patterned using the photoresist pattern as an etch mask to form the channel pattern 250 and the first barrier 291 on the insulating layer 240.

The channel pattern 250 is formed to correspond to the gate electrode 221. The channel pattern 250 includes an amorphous silicon pattern 251 and an n+ amorphous silicon pattern 252. The amorphous silicon pattern 251 is formed on the insulating layer 240. A pair of n+ amorphous silicon patterns 252 separated from each other is formed on the amorphous silicon pattern 251.

The first barrier 291 is formed by sequentially stacking a barrier 291a formed of amorphous silicon, and a barrier 291b formed of amorphous silicon doped with high concentration impurities.

Figure 15D:
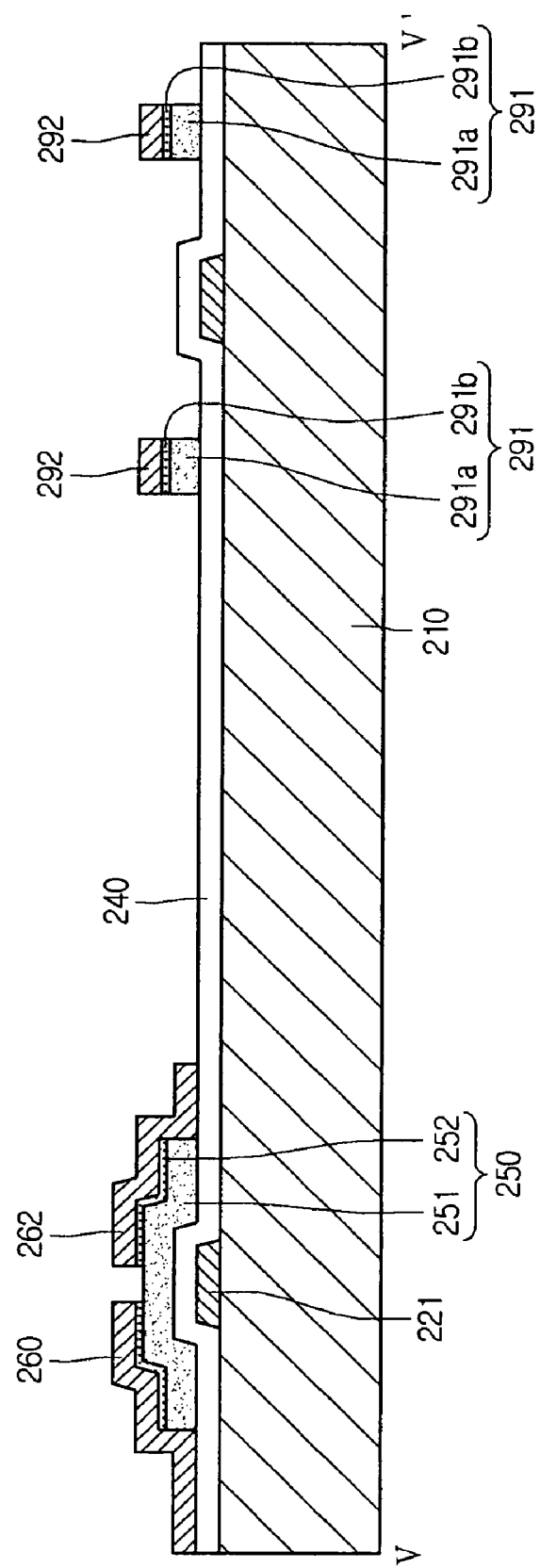

Referring to FIG. 15D, after the channel pattern 250 and the first barrier 291 are formed, a data line 260, a drain electrode 262, and a second barrier 292 are formed on the insulating layer 240.

To form the data line 260 and the drain electrode 262, a source/drain metal layer is formed on the entire surface of the insulating layer 240 on which the channel pattern 250 has been formed. Examples of a material that can used for the source/drain metal layer include Al, an Al alloy, and Cu. A photoresist film is formed on the entire surface of the source/drain metal layer, and patterned through a photolithography process including an exposure process and a developing process to form a photoresist pattern. When seen from a plane, the photoresist pattern has a shape corresponding to the data line 260, the drain electrode 262, and the second barrier 292. The source/drain metal layer is patterned using the photoresist pattern as an etch mask to form the data line 260, the drain electrode 262, and the second barrier 292 on the insulating layer 240.

The data line 260 includes a source electrode 261 formed on one of the pair of n+ amorphous silicon patterns 252. The drain electrode 262 is formed on the other of the pair of n+ amorphous silicon patterns 252.

Figure 15E:
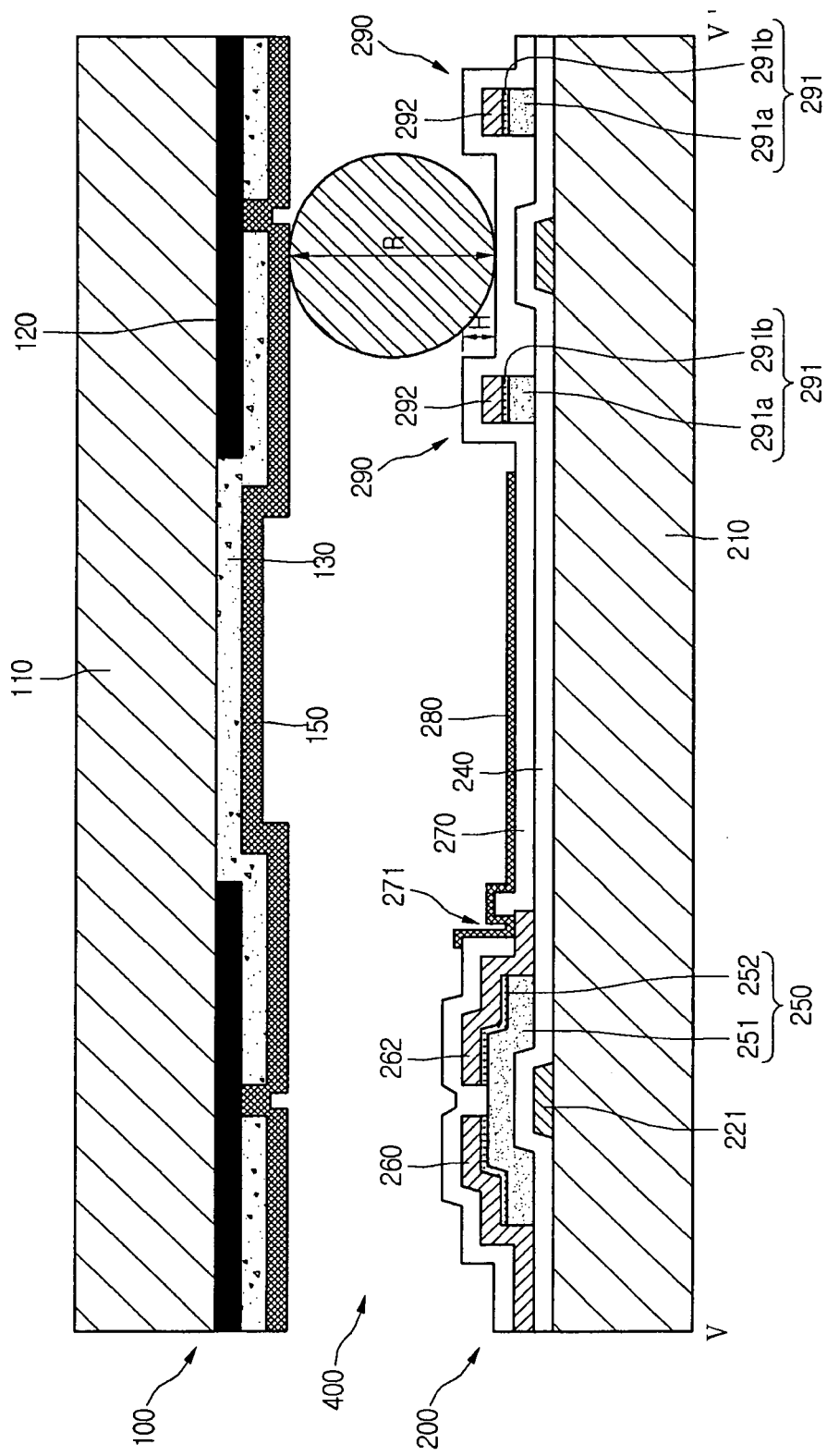

Referring to FIG. 15E, after the data line 260, the drain electrode 262, and the second barrier 292 are formed, a passivation layer 270 and a pixel electrode 280 are formed. The passivation layer 270 includes a contact hole 271 covering the data line 260 and the drain electrode 262, and exposing a portion of the drain electrode 262.

To form the passivation layer 270, an organic layer is formed on the entire surface of the second base substrate 210 on which the data line 260 and the drain electrode 262 have been formed. A photoresist film is formed on the entire surface of the inorganic layer. The photoresist film is patterned through a photolithography process including an exposure process and a developing process to form a photoresist pattern on the inorganic layer. The photoresist pattern exposes a portion of the inorganic layer corresponding to a portion of the drain electrode 262. The inorganic layer is patterned using the photoresist pattern as an etch mask to form the passivation layer 270 on the second base substrate 210.

After the passivation layer 270 is formed, the pixel electrode 280 is formed on the passivation layer 270. The pixel electrode 280 is electrically connected to the portion of the drain electrode exposed through the contact hole 271.

To form the pixel electrode 280, a transparent conductive metal layer is formed on the entire surface of the passivation layer 270. A photoresist film is formed on the entire surface of the metal layer. The photoresist film is patterned through a photolithography process including an exposure process and a developing process to form a photoresist pattern on the metal layer. When seen from a plane, the photoresist pattern has a shape corresponding to the pixel electrode 280. The metal layer is patterned using the photoresist pattern as an etch mask to form the pixel electrode 280 on the passivation layer 270.

After the pixel electrode 280 is formed, a ball spacer 300 is disposed within the barrier 290, and the first substrate 100 and the second substrate 200 are coupled to each other.

After the pixel electrode 280 is formed, the ball spacer 300 is disposed within the barrier 290. The ball spacer 300 is interposed between the first substrate 100 and the second substrate 200 to maintain a cell gap between the first substrate 100 and the second substrate 200. Examples of a material that can be used for the ball spacer 300 include silica and a resin. The radius R of the ball spacer 300 is about 2.5 μm to 6.5 μm.

The ball spacer 300 is mixed with a solvent and sprayed only within the barrier 290 through a nozzle so that the ball spacer 300 is disposed. The solvent evaporates and the ball spacer 300 is disposed within the barrier 290. One to thirty ball spacers 300 can be disposed within the barrier 290. The ball spacer 300 can be disposed within the lower barrier 290 using an ink-jet method.

The first substrate 100 and the second substrate 200 are coupled to each other using a sealing member, and LCs are dropped between the first substrate 100 and the second substrate 200, so that the TN mode LCD device is manufactured.

As described above, the LCD device according to an embodiment includes the barrier controlling the movement of the spacer to prevent the spacer from moving to the pixel region. Therefore, according to the embodiment, light leakage and aperture ratio reduction caused by the spacer disposed in the pixel region can be prevented.

Also, an embodiment provides a method for manufacturing the LCD device including the barrier. Therefore, according to the embodiment, light leakage is prevented, and an LCD device having a high aperture ratio can be manufactured.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:
   a first substrate;
   a second substrate facing the first substrate;
   a ball spacer between the first substrate and the second substrate;
   a gate line on the first substrate, the gate line having a gate electrode;
   a common line parallel to the gate line and having a common electrode,
   an insulating layer insulating the gate line;
   a channel pattern on the insulating layer, the channel pattern corresponding to the gate electrode;
   a data line having a source electrode on the channel pattern;
   a drain electrode on the channel pattern, the drain electrode being separated from the source electrode;
   a passivation layer covering the channel pattern, the data line and the drain electrode;
   a pixel electrode electrically connected with the drain electrode and disposed on the passivation layer;
   a lower barrier disposed on the passivation layer; and
   an upper barrier disposed on the second substrate and facing the lower barrier;
   wherein a first side wall of the lower barrier protrudes from the passivation layer along the gate line,
   wherein a second side wall of the lower barrier protrudes from the passivation layer along the common line and faces the first side wall so that a movement of the ball spacer is restricted by the first and second side walls,
   wherein the ball spacer is disposed between the lower barrier on the gate line and the lower barrier on the common line,
   wherein a portion of the ball spacer is disposed on the gate line and another portion of the ball spacer is disposed on the common lines, and
   wherein the first and second side walls are made of a different material from the passivation layer and the pixel electrode.

2. The liquid crystal display device according to claim 1, wherein the second substrate comprises a black matrix pattern blocking light, and the upper barrier is on a position corresponding to the black matrix pattern.

3. The liquid crystal display device according to claim 1, wherein the second substrate comprises:
   a gate line on a base substrate, the gate line having a gate electrode;
   an insulating layer insulating the gate line;
   a channel pattern on the insulating layer, the channel pattern corresponding to the gate electrode;
   a data line having a source electrode on the channel pattern;
   a drain electrode on the channel pattern, the drain electrode being separated from the source electrode; and
   a pixel electrode electrically connected with the drain electrode,
   the barrier being formed in the same layer as that of one of the channel pattern and the data line.

4. The liquid crystal display device according to claim 1, wherein the second substrate comprises:
   a gate line on a base substrate, the gate line having a gate electrode;
   an insulating layer insulating the gate line;
   a channel pattern on the insulating layer, the channel pattern corresponding to the gate electrode;
   a data line having a source electrode on the channel pattern;
   a drain electrode on the channel pattern, the drain electrode being separated from the source electrode; and
   a pixel electrode electrically connected with the drain electrode,
   the barrier comprising a first barrier in the same layer as that of the channel pattern, and a second barrier in the same layer as that of the data line, the second barrier being on the first barrier.

5. The liquid crystal display device according to claim 1, wherein the spacer comprises a ball spacer having a diameter of about 2.5 μm to 6.5 μm, and a height of the barrier is 5% to 80% of the diameter of the ball spacer.

6. The liquid crystal display device according to claim 1, wherein one to thirty spacers are disposed within the barrier.

7. The liquid crystal display device according to claim 1, wherein at least one of the upper barrier and the lower barrier has one of a closed loop shape and an opened loop shape when seen from a plane.

* * * * *